(12) United States Patent
Isobe et al.

(10) Patent No.: US 9,821,454 B2
(45) Date of Patent: Nov. 21, 2017

(54) LINK ACTUATION DEVICE

(71) Applicant: NTN CORPORATION, Osaka (JP)

(72) Inventors: Hiroshi Isobe, Iwata (JP); Seigo Sakata, Iwata (JP); Hiroyuki Yamada, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/157,014

(22) Filed: May 17, 2016

(65) Prior Publication Data
US 2016/0256998 A1    Sep. 8, 2016

Related U.S. Application Data

(63) Continuation of application No. PCT/JP2014/080205, filed on Nov. 14, 2014.

(30) Foreign Application Priority Data

Nov. 22, 2013  (JP) ................................ 2013-241845

(51) Int. Cl.
*B25J 9/00* (2006.01)
*B23K 9/12* (2006.01)
(Continued)

(52) U.S. Cl.
CPC .......... *B25J 9/0048* (2013.01); *B05B 13/0431* (2013.01); *B23K 9/12* (2013.01);
(Continued)

(58) Field of Classification Search
CPC .... B25J 9/0048; B05B 13/0431; B23K 31/02; B23K 9/12; B23K 9/127; Y10S 901/42; F16H 21/46; G05G 9/04737
See application file for complete search history.

(56) References Cited

U.S. PATENT DOCUMENTS

| 5,388,935 A | 2/1995 | Sheldon |
| 5,893,296 A | 4/1999 | Rosheim |
| (Continued) | | |

FOREIGN PATENT DOCUMENTS

| EP | 0 987 087 A2 | 3/2000 |
| JP | 2000-94245 | 4/2000 |
| (Continued) | | |

OTHER PUBLICATIONS

International Preliminary Report on Patentability dated Jun. 2, 2016 in corresponding International Patent Application No. PCT/JP2014/080205.

(Continued)

*Primary Examiner* — Victor MacArthur

(57) ABSTRACT

This link actuation device includes: a proximal end side link hub; a distal end side link hub; and three or more link mechanisms which each couple the distal end side link hub to the proximal end side link hub. Each link mechanism includes: proximal side and distal side end link members, and an intermediate link member. The link mechanism is provided with an actuator which arbitrarily changes the posture of the distal end side link hub relative to the proximal end side link hub. A workpiece is disposed on the proximal end side link hub, and an end effector is disposed in the distal end side link hub so as to face inside of arrangement of the link hubs and perform work onto the workpiece.

6 Claims, 18 Drawing Sheets

(51) Int. Cl.
*B23K 9/127* (2006.01)
*B05B 13/04* (2006.01)
*G05G 9/047* (2006.01)
*F16H 21/46* (2006.01)
*B23K 31/02* (2006.01)

(52) U.S. Cl.
CPC .............. *B23K 9/127* (2013.01); *B23K 31/02* (2013.01); *F16H 21/46* (2013.01); *G05G 9/04737* (2013.01); *Y10S 901/42* (2013.01)

(56) References Cited

U.S. PATENT DOCUMENTS

| | | | | |
|---|---|---|---|---|
| 7,472,622 | B2* | 1/2009 | Isobe | B25J 17/0266 |
| | | | | 414/729 |
| 7,810,248 | B2 | 10/2010 | McMurtry | |
| 7,971,505 | B2* | 7/2011 | Isobe | B25J 9/0048 |
| | | | | 74/490.05 |
| 8,316,961 | B2* | 11/2012 | Isobe | A61B 17/1631 |
| | | | | 128/898 |
| 2005/0159075 | A1* | 7/2005 | Isobe | B25J 17/0266 |
| | | | | 446/104 |
| 2005/0199085 | A1* | 9/2005 | Isobe | B25J 9/0048 |
| | | | | 74/490.05 |
| 2010/0058602 | A1 | 3/2010 | McMurtry | |
| 2012/0043100 | A1* | 2/2012 | Isobe | A61B 17/1631 |
| | | | | 173/42 |
| 2015/0114163 | A1 | 4/2015 | Rosheim | |

FOREIGN PATENT DOCUMENTS

| | | |
|---|---|---|
| JP | 2000-246567 | 9/2000 |
| JP | 2003-231083 | 8/2003 |
| JP | 2004-261886 | 9/2004 |
| JP | 2009-539636 | 11/2009 |
| JP | 2009-297793 | 12/2009 |
| WO | WO 2007/144603 A2 | 12/2007 |
| WO | WO 2013/070938 A1 | 5/2013 |

OTHER PUBLICATIONS

International Search Report dated Feb. 17, 2015 in corresponding International Patent Application No. PCT/JP2014/080205.
Chinese Office Action dated Nov. 18, 2016 from Chinese Patent Application No. 201480062955.8, 7 pages.

\* cited by examiner

LINK ACTUATION DEVICE

CROSS REFERENCE TO THE RELATED APPLICATION

This application is a continuation application, under 35 U.S.C §111(a) of international patent application No. PCT/JP2014/080205, filed Nov. 14, 2014, which claims priority to Japanese patent application No. 2013-241845, filed Nov. 22, 2013, the entire disclosure of which is herein incorporated by reference as a part of this application.

BACKGROUND OF THE INVENTION (Field of the Invention)

The present invention relates to a link actuation device to be used in a device, such as a medical device, an industrial device or the like, that performs fast operation and that requires a precise and wide operating range.

(Description of Related Art)

Parallel link mechanisms to be used in various types of work devices are suggested in Patent Documents 1 and 2 listed below. With respect to the parallel link mechanism disclosed in Patent Document 1, its configuration is comparatively simple, but the operating angle of each link is small. Thus, there is a problem that if the operating range of the travelling plate is set to be large, the link length is increased, thus resulting in large dimensions of the entire mechanism. The parallel link mechanism disclosed in Patent Document 2 is configured such that a distal end side link hub is coupled to a proximal end side link hub such that the posture of the distal end side link hub relative to the proximal end side link hub can be changed via three or more quadric chain link mechanisms. Accordingly, the parallel link mechanism is compact in size but can operate in a precise and wide operating range.

RELATED DOCUMENT

Patent Document

[Patent Document 1] JP Laid-open Patent Publication No. 2000-094245

[Patent Document 2] U.S. Pat. No. 5,893,296

With the configurations of the parallel link mechanisms of Patent Document 1 and Patent Document 2, in a case where an end effector is mounted on the distal end side, the inertia is increased along with increasing the weight of the end effector. Thus, fast and highly accurate operation cannot be realized. With the configuration of the parallel link mechanism of Patent Document 2, when work is performed onto a workpiece whose surface has a spherical shape or a cylindrical shape, an additional degree of freedom is required that allows movement on a plane to which the central axis of the proximal end side link hub is perpendicular.

SUMMARY OF THE INVENTION

An object of the present invention is to provide a link actuation device that can operate in a wide operating range and that can perform fast and high accuracy positioning operation even when a heavy end effector is mounted thereto.

A link actuation device according to the present invention includes: a proximal end side link hub; a distal end side link hub; and three or more link mechanisms, each coupling the distal end side link hub to the proximal end side link hub such that a posture of the distal end side link hub is variable relative to the proximal end side link hub. Each of the link mechanisms includes: a proximal side end link member having one end thereof rotatably coupled to the proximal end side link hub; a distal side end link member having one end thereof coupled to the distal end side link hub; and an intermediate link member having opposite ends thereof rotatably coupled to other ends of the proximal side end link member and the distal side end link member, respectively. Each of the link mechanisms has such a shape that a geometric model of the link mechanism represented by straight lines shows symmetry between a proximal end side portion thereof and a distal end side portion thereof with respect to a center portion of the intermediate link member. Two or more link mechanisms among the three or more link mechanisms are each provided with an actuator which arbitrarily changes the posture of the distal end side link hub relative to the proximal end side link hub. In this link actuation device, an end effector is disposed in one of the proximal end side and distal end side link hubs so as to face inside of arrangement of the proximal end side link hub and the distal end side link hub, and the end effector performs work onto a workpiece disposed on the other of the proximal end side and distal end side link hubs. For example, the workpiece is supported by the link hub that is on the opposite side to the link hub where the end effector is disposed.

In this specification, "proximal end side" and "distal end side" are used in the following meaning. That is, the point, where the central axis of the revolute pair between a link hub and each end link member and the central axis of the revolute pair between each end link member and its corresponding intermediate link member cross each other, is referred to as the "spherical link center" of the link hub. Then, the straight line that passes this spherical link center and that crosses the central axis of the revolute pair between the link hub and the end link member at a right angle is referred to as the "link hub central axis". Then, when viewed from the intersection where the central axes of the respective proximal end side and the distal end side link hubs cross each other, the direction toward the spherical link center on the proximal end side is referred to as "proximal end side" and the direction toward the spherical link center on the distal end side is referred to as "distal end side".

"Inside of arrangement of the link hubs" in the above description is, to be precise, defined as the direction extending from each of the proximal end side link hub and the distal end side link hub toward the intersection. Therefore, "an end effector is disposed so as to face inside of arrangement of the link hubs" includes, for example, a case where the end effector disposed on the distal end side link hub passes through the inside of the arrangement of the link mechanisms and protrudes to the proximal end side relative to the proximal end side link hub.

According to the above configuration, the proximal end side link hub, the distal end side link hub and three or more link mechanisms cooperate together to form a two-degrees-of-freedom mechanism in which the distal end side link hub is rotatable in two axial directions perpendicular to each other, relative to the proximal end side link hub. This two-degrees-of-freedom mechanism is compact in size but can realize a wide range of movement of the distal end side link hub. For example, the maximum bend angle between the central axis of the proximal end side link hub and the central axis of the distal end side link hub can be about ±90°, and the angle of traverse of the distal end side link hub relative to the proximal end side link hub can be set in a range of 0° to 360°. By controlling operation of each posture control actuator, the posture of the distal end side link hub relative to the proximal end side link hub can be arbitrarily changed.

As in the above configuration, when the end effector is disposed so as to face the inside of the arrangement of the link hubs, compared with a case where the end effector is disposed so as to face outside of the arrangement of the link hubs, the distal end serving as the working portion of the end effector comes closer to the rotation center of the link actuation device, thus reducing the moment of inertia of the entirety of the end effector. The rotation center of the link actuation device corresponds to the intersection of the link hub central axes on the proximal end side and the distal end side. Since the moment of inertia of the entirety of the end effector is reduced, even when a heavy end effector is mounted, fast operation is achieved. In addition, low output, energy saving and downsizing of the actuator for posture changing can be attained. In particular, this configuration is effective when an end effector having an elongated shape, or an end effector whose center of gravity is on the distal end side closer to the working portion is mounted.

In the present invention, the workpiece may be disposed between the proximal end side link hub and the distal end side link hub. In this case, the distal end of the end effector is positioned so as to face toward the rotation center of the link actuation device. Thus, without being combined with another mechanism such as an XY stage, the link actuation device can perform work onto the workpiece from various directions.

In the present invention, the end effector may be disposed on the distal end side link hub, a work hole which allows the end effector to be inserted therein may be provided in the proximal end side link hub, and the end effector inserted in the work hole may perform work onto the workpiece which is directly or indirectly supported by the proximal end side link hub and which is located to a proximal end side relative to the proximal end side link hub. With this configuration, even when an end effector that performs work such as jetting grease or applying laser in a non-contact manner is mounted, the end effector can perform work onto the workpiece through the work hole. In a case where an end effector having an elongated shape is mounted, the end effector can be caused to pass through the work hole such that the distal end of the end effector protrudes to the proximal end side relative to the proximal end side link hub, thereby to perform work onto the workpiece.

In the present invention, the end effector may comprise an applicator that applies a liquid substance to a surface of the workpiece. The applicator is, for example, an inkjet device for applying a paint, a dispenser for applying a liquid agent such as grease or adhesive, or the like. Since this link actuation device can have a wide range of movement of the distal end side link hub relative to the proximal end side link hub, an applicator mounted as the end effector can apply a liquid substance from a wide range of directions, to a workpiece having a spherical surface, a cylindrical surface or another curved surface.

In the present invention, the end effector may be a welding torch. Since the welding torch has an elongated shape, a remarkable effect of reducing the moment of inertia is obtained by disposing the end effector so as to face inside of the arrangement of the link hubs. In addition, the welding torch has, because of its function, a greater diameter in the root portion than in the distal end portion thereof. Thus, if the welding torch is disposed so as to face outside of the arrangement of the link hubs, the root portion may interfere with the link mechanism, which may cause a narrower operating range. Therefore, it is better to dispose the torch used as the end effector so as to face the inside of the arrangement of the link hubs.

In the present invention, the end effector may be mounted on a linear motion actuator which advances and retracts along a central axis of the link hub where the end effector is disposed. This configuration allows positional control of the end effector in the central axis direction. The link actuation device has a configuration in which the radius of rotation, i.e., the distance between the rotation center and the spherical link center varies. Therefore, when the workpiece is disposed between the proximal end side link hub and the distal end side link hub, the variation in the radius of rotation can be corrected.

In the present invention, the link hub that supports the workpiece may be provided with a linear motion actuator configured to support the workpiece and to advance and retract along a central axis of such a link hub. This configuration allows positional control of the workpiece in the central axis direction. For example, when the workpiece is disposed between the proximal end side link hub and the distal end side link hub, the workpiece can be controlled so as to be located at the rotation center of the link actuation device at all times. Further, in a combination with a configuration where the end effector is mounted in the linear motion actuator, the distance between the distal end of the end effector and the workpiece can be kept constant.

In the present invention, the link hub that supports the workpiece may be provided with an XY stage which allows the workpiece to move along a plane perpendicular to the central axis of the link hub. This configuration allows control of the workpiece in directions along the plane. In particular, in a configuration where the workpiece is provided inside the arrangement of the proximal end side link hub and the distal end side link hub, in a case where a workpiece that has an cylindrical shape such as a gear is used, work can be performed onto the entire periphery of the cylindrical surface by moving the workpiece in a direction along the plane.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
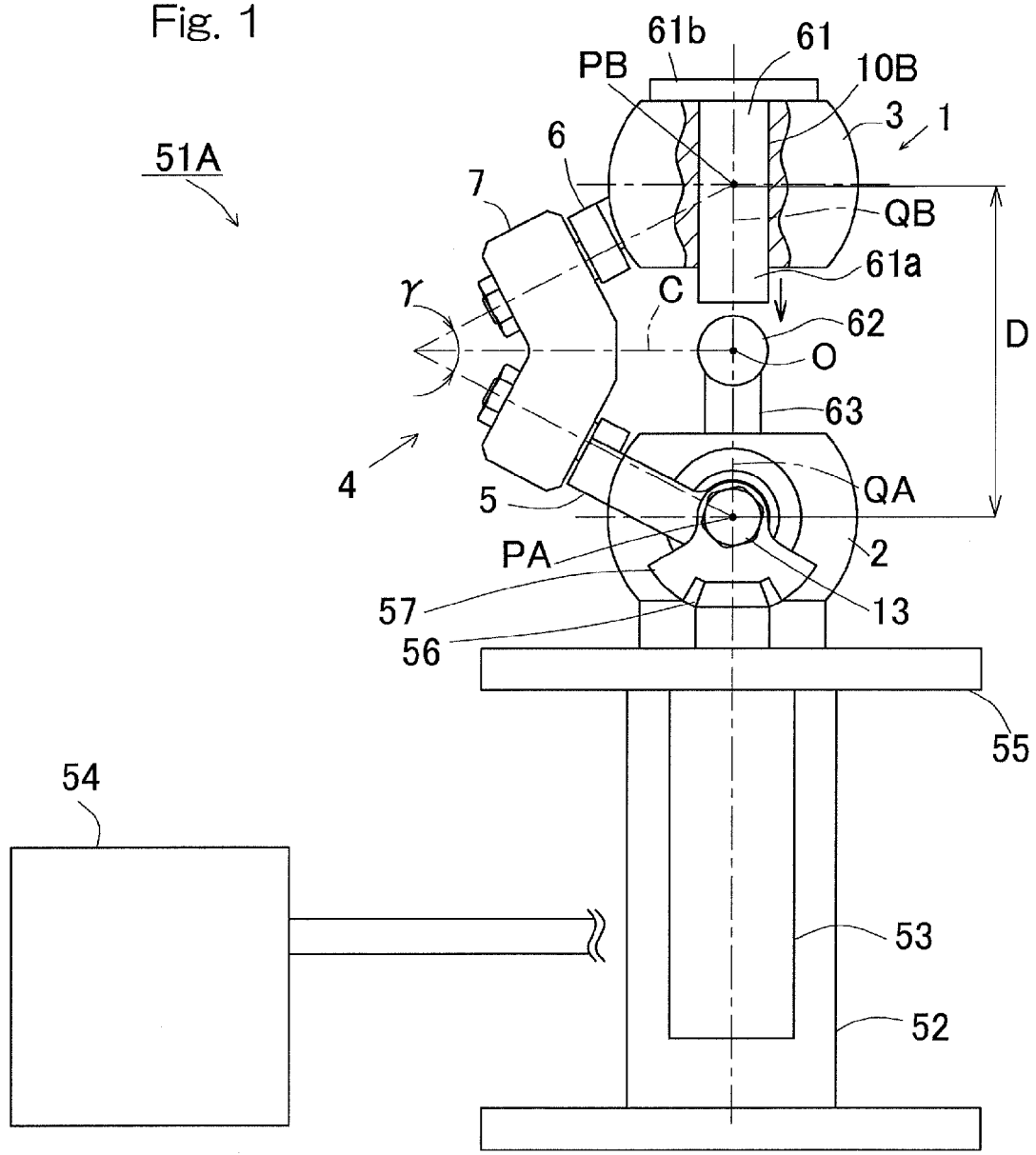
FIG. 1 is a front view of a link actuation device according to a first embodiment of the present invention, shown with a part thereof omitted.
Figure 2:
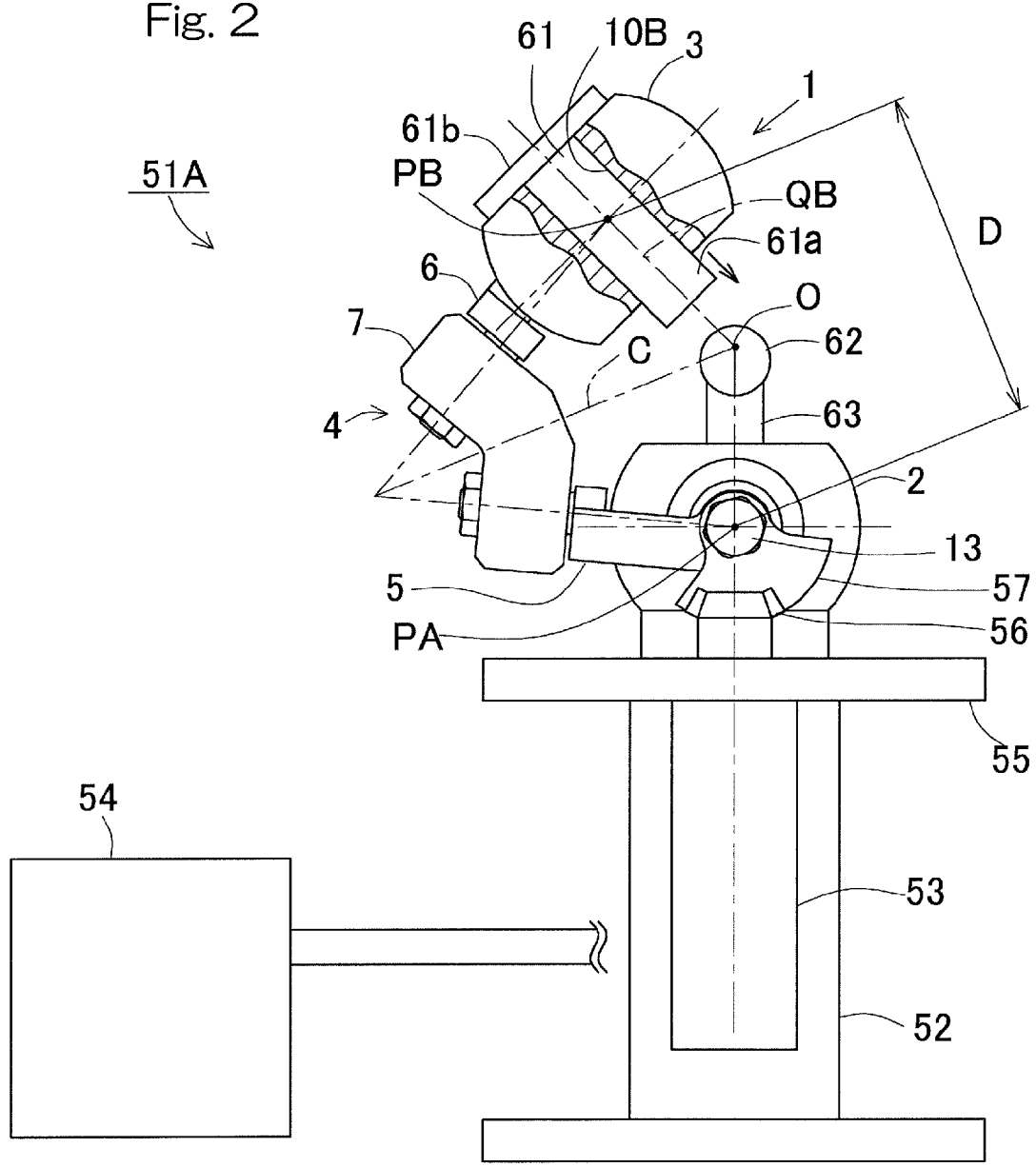
FIG. 2 is a front view showing a different operation state of the link actuation device, shown with a part thereof omitted.

A first embodiment of the present invention will be described with reference to FIG. 1 to FIG. 5. FIG. 1 and FIG. 2 are front views of a link actuation device 51A in different states, shown with a part thereof omitted, respectively. This link actuation device 51A includes: an actuation device body 1; a base 52 which supports the actuation device body 1; a plurality (the same number as that of link mechanisms 4 described later) of actuators 53 which actuate the actuation device body 1; and a controller 54 which actuates the actuation device body 1 through operation of these actuators 53. A control device (not shown) which controls the actuators 53 may be provided inside the controller 54, or may be provided separately from the controller 54.

The actuation device body 1 will be described first. The actuation device body 1 is of a type in which a distal end side link hub 3 is coupled to a proximal end side link hub 2 via three link mechanisms 4 such that the posture of the distal end side link hub 3 can be changed relative to the proximal end side link hub 2. FIG. 1 and FIG. 2 show only one link mechanism 4. The number of the link mechanisms 4 may be four or more.

Figure 3:
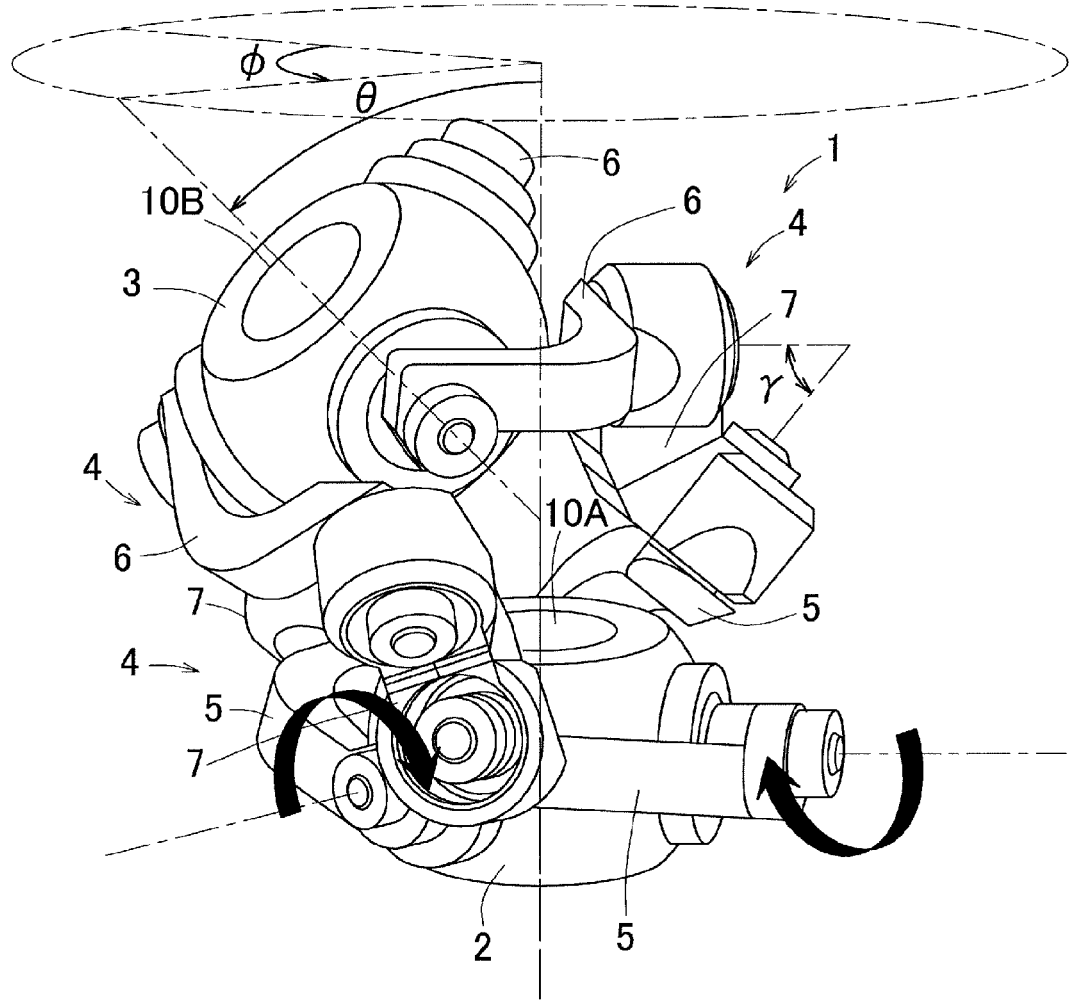
FIG. 3 is a perspective view of a three-dimensional representation of an actuation device body of the link actuation device.

FIG. 3 is a perspective view of a three-dimensional representation of the actuation device body 1. Each link mechanism 4 is composed of a proximal side end link member 5, a distal side end link member 6, and an intermediate link member 7, and forms a quadric chain link mechanism composed of four revolute pairs. The proximal side and distal side end link members 5 and 6 each have an L-shape. The base end of the proximal side end link member 5 is rotatably coupled to the proximal end side link hub 2, and the base end of the distal side end link member 6 is rotatably coupled to the distal end side link hub 3. The intermediate link member 7 has its opposite ends rotatably coupled to the tip ends of the proximal side and distal side end link members 5 and 6, respectively.

The actuation device body 1 is formed by combining two spherical link mechanisms. That is, the central axis of the revolute pair between the proximal end side link hub 2 and each proximal side end link member 5, and the central axis of the revolute pair between each proximal side end link member 5 and its corresponding intermediate link member 7 cross each other at a proximal end side spherical link center PA (FIG. 1, FIG. 2). Similarly, the central axis of the revolute pair between the distal end side link hub 3 and each distal side end link member 6, and the central axis of the revolute pair between each distal side end link member 6 and its corresponding intermediate link member 7 cross each other at a distal end side spherical link center PB (FIG. 1, FIG. 2).

Further, the distance from the proximal end side spherical link center PA to the revolute pair between the proximal end side link hub 2 and each proximal side end link member 5 is identical, and the distance from the proximal end side spherical link center PA to the revolute pair between each proximal side end link member 5 and its corresponding intermediate link member 7 is identical. The first central axis of the revolute pair between the proximal side end link member 5 and the intermediate link member 7 may form a certain cross angle γ, or may be parallel relative to a second central axis described latter. Similarly, the distance from the distal end side spherical link center PB to the revolute pair between the distal end side link hub 3 and each distal side end link member 6 is identical, and the distance from the distal end side spherical link center PB to the revolute pair between each distal side end link member 6 and its corresponding intermediate link member 7 is identical. The second central axis of the revolute pair between the distal side end link member 6 and the intermediate link member 7 may also form a certain cross angle γ, or may be parallel relative to the first central axis.

Figure 4:
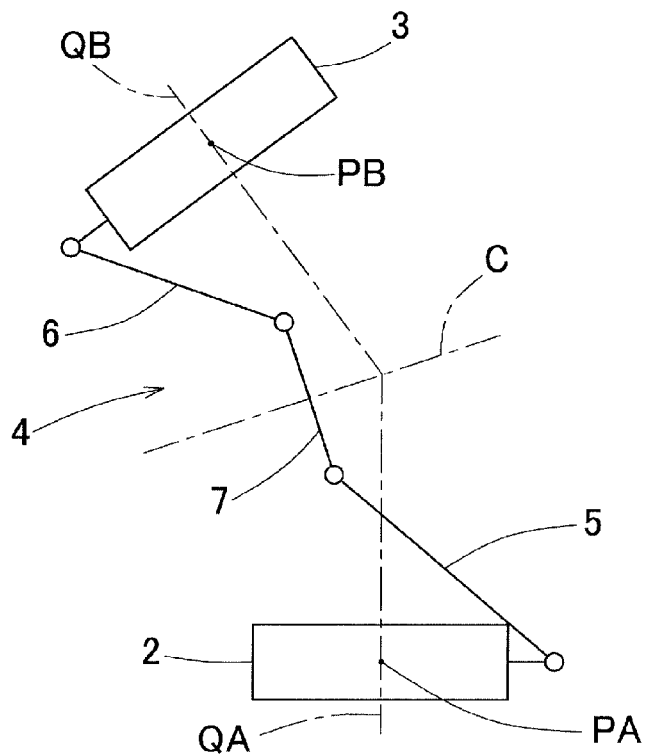
FIG. 4 shows one link mechanism of the link actuation device depicted with straight lines.

That is, the three link mechanisms 4 have a geometrically identical configuration. The geometrically identical configuration means that a geometric model depicted in straight lines representing the link members 5, 6, and 7, i.e., a model depicted with the revolute pairs and straight lines connecting these revolute pairs, represents a shape in which the proximal end side portion thereof and the distal end side portion thereof are symmetrical with each other with respect to the center portion of the intermediate link member 7. FIG. 4 is a diagram showing one link mechanism 4 depicted in straight lines.

The link mechanism 4 according to this embodiment is of a rotation symmetrical type, and employs a positional configuration in which the positional relationship between the proximal end side link hub 2 and the proximal side end link member 5 and the positional relationship between the distal end side link hub 3 and the distal side end link member 6 is in rotation symmetry relative to a center line C of the intermediate link member 7. FIG. 1 shows a state where a central axis of the proximal end side link hub 2 (hereinafter, referred to as "proximal end side link hub central axis") QA, and the central axis of the distal end side link hub 3 (hereinafter, referred to as "distal end side link hub central axis") QB are on the same line. On the other hand, FIG. 2 shows a state where the distal end side link hub central axis QB has a predetermined operating angle relative to the proximal end side link hub central axis QA. Even when the posture of each link mechanism 4 changes, the distance D between the proximal end side spherical link center PA and the distal end side spherical link center PB does not change.

The proximal end side and distal end side link hub central axes QA, QB are straight lines that pass the proximal end side and distal end side spherical link center PA, PB, and that cross, at a right angle, the central axis of the revolute pair between the proximal end side and distal end side link hubs 2, 3 and the proximal side end and distal side link members 5, 6.

The proximal end side link hub 2, the distal end side link hub 3, and the three link mechanisms 4 cooperate together to form a two-degrees-of-freedom mechanism in which the distal end side link hub 3 is rotatable in two axial directions perpendicular to each other, relative to the proximal end side link hub 2. In other words, the mechanism allows the distal end side link hub 3 to rotate with two degrees of freedom to change its posture, relative to the proximal end side link hub 2. This two-degrees-of-freedom mechanism is compact in size, but can realize a wide range of movement of the distal end side link hub 3 relative to the proximal end side link hub 2. For example, the maximum value of a bend angle θ (FIG. 3) (maximum bend angle) between the proximal end side link hub central axis QA and the distal end side link hub central axis QB can be about ±90°. In addition, an angle of traverse φ (FIG. 3) of the distal end side link hub 3 relative to the proximal end side link hub 2 can be set in a range of 0° to 360°.

The bend angle θ means a vertical angle formed when the distal end side link hub central axis QB is inclined relative to the proximal end side link hub central axis QA. The angle of traverse φ means a horizontal angle formed when the distal end side link hub central axis QB is inclined relative to the proximal end side link hub central axis QA.

In the actuation device body 1, while the following conditions (1) to (4) are satisfied, the angle and the positional relationship between the intermediate link member 7 and the proximal side end link member 5 is the same as the angle and the positional relationship between the intermediate link member 7 and the distal side end link member 6 with respect to the symmetry plane of the intermediate link member 7. In this case, due to the geometrical symmetry, a proximal side composed of the proximal end side link hub 2 and the proximal side end link member 5 will move in the same manner as a distal side composed of the distal end side link hub 3 and distal side end link member 6.

(1) The angle between the central axes of the revolute pairs between the proximal side/distal side end link members 5, 6 and the proximal end side/distal end side link hub 2, 3, in the link mechanisms 4 are identical with each other, and the lengths between the revolute pairs and the proximal end side/distal end side spherical link centers PA, PB are identical with each other.

(2) The central axis of the revolute pair between the proximal side/distal side end link member 5, 6 and the proximal end side/distal end side link hub 2, 3 and the central axis of the revolute pair between the proximal side/distal side end link member 5, 6 and the intermediate link member 7 of each link mechanism 4 cross the spherical link center PA, PB on the proximal end side/distal end side.

(3) The geometrical shape of the proximal side end link member 5 and the geometrical shape of the distal side end link member 6 are identical to each other.

(4) Also with respect to the intermediate link member 7, the shape on the proximal end side and the shape on the distal end side are identical to each other.

Each of the proximal end side link hub 2 and the distal end side link hub 3 has a doughnut shape whose outer shape is spherical, in which a through-hole 10A, 10B is formed in a center portion thereof so as to extend along its corresponding link hub central axis QA, QB. The center of the through-hole 10A, 10B is aligned with its corresponding link hub central axis QA, QB. The proximal side end link members 5 and the distal side end link members 6 are respectively rotatably coupled to the outer peripheral faces of the proximal end side link hub 2 and the distal end side link hub 3, at equal intervals in the circumferential direction thereof.

Figure 5:
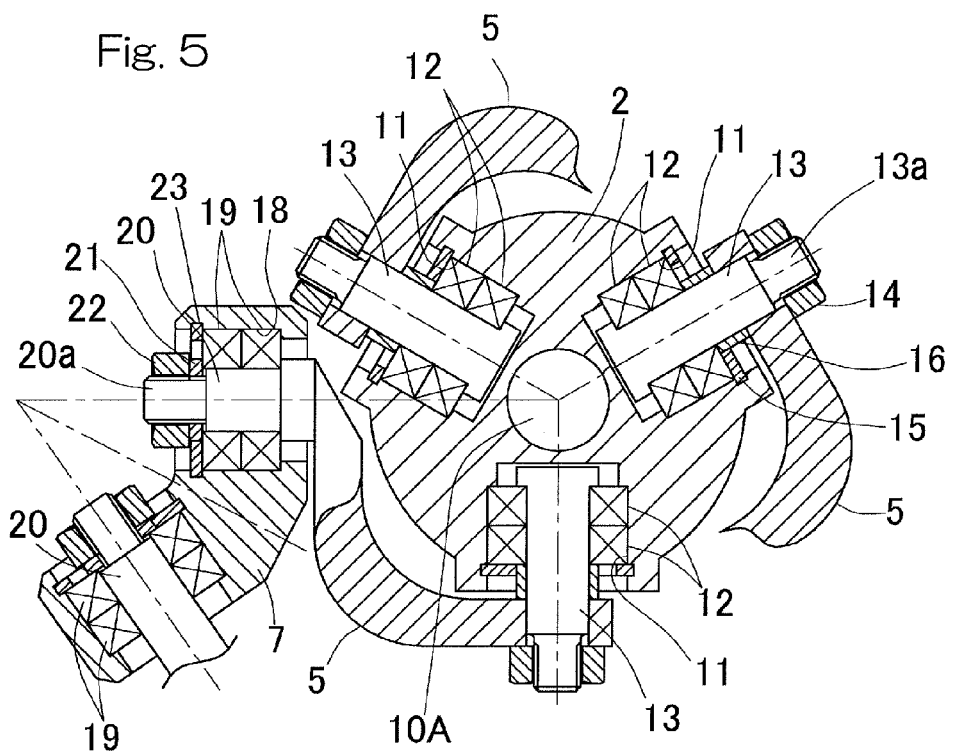
FIG. 5 is a transverse cross-sectional view of a proximal end side link hub of the link actuation device.

FIG. 5 is a cross-sectional view showing a revolute pair section between the proximal end side link hub 2 and the proximal side end link member 5, and a revolute pair section between the proximal side end link member 5 and the intermediate link member 7. In the proximal end side link hub 2, shaft holes 11 extending in radial directions are formed at three positions in the circumferential direction of the outer periphery of the proximal end side link hub 2. Two bearings 12 provided in each shaft hole 11 rotatably support a shaft member 13. The center axis of each shaft member 13 is aligned with the central axis of the revolute pair between its corresponding proximal side end link member 5 and the proximal end side link hub 2. An outer end portion of each shaft member 13 protrudes from the proximal end side link hub 2, and this protruding portion is provided with a screw portion 13a. The proximal side end link member 5 is connected to be fastened and fixed to the screw portion 13a with a nut 14.

Each bearing 12 is a rolling bearing such as a deep groove ball bearing, for example, and includes an outer ring (not shown) fitted on the inner periphery of the shaft hole 11 and an inner ring (not shown) fitted on the outer periphery of the shaft member 13. The outer ring is prevented from slipping off by a retaining ring 15. A spacer 16 is interposed between the inner ring and the proximal side end link member 5, and the fastening force of the nut 14 is transmitted to the inner ring via the proximal side end link member 5 and the spacer 16, thereby applying a predetermined preload to the bearing 12.

With respect to the revolute pair section between the proximal side end link member 5 and the intermediate link member 7, two bearings 19 are provided in a communication hole 18 formed on each of opposite ends of the intermediate link member 7, and a shaft portion 20 defined at the distal end of the proximal side end link member 5 is rotatably supported by these bearings 19. The bearings 19 are fastened and fixed with a nut 22 via a spacer 21.

Each bearing 19 is a rolling bearing such as a deep groove ball bearing, for example, and includes an outer ring (not shown) fitted on the inner periphery of the communication hole 18 and an inner ring (not shown) fitted on the outer periphery of the shaft portion 20. The outer ring is prevented from slipping off by a retaining ring 23. The fastening force of the nut 22 thread-engaged with a distal end screw portion 20a of the shaft portion 20 is transmitted to the inner ring via the spacer 21, thereby applying a predetermined preload to the bearing 19. In FIG. 5, a bevel gear 57 described later is not shown.

The revolute pair section between the proximal end side link hub 2 and the proximal side end link member 5, and the revolute pair section between the proximal side end link member 5 and the intermediate link member 7 have been described. However, the revolute pair section between the distal end side link hub 3 and the distal side end link member 6, and the revolute pair section between the distal side end link member 6 and the intermediate link member 7 have the same configuration as that described above (not shown).

As described above, in each link mechanism 4, the bearings 12 and 19 are provided in the four revolute pair sections, i.e., the revolute pair section between the proximal end side link hub 2 and the proximal side end link member 5, the revolute pair section between the distal end side link hub 3 and the distal side end link member 6, the revolute pair section between the proximal side end link member 5 and the intermediate link member 7, and the revolute pair section between the distal side end link member 6 and the intermediate link member 7. Accordingly, the frictional resistance in each revolute pair can be reduced, whereby the rotational resistance can be reduced. As a result, smooth power transmission can be ensured and durability can be increased.

In the structure provided with the bearings 12, 19, by applying a preload to the bearings 12, 19, a radial clearance and a thrust clearance are eliminated, and rattling of the revolute pair can be suppressed. Moreover, rotation phase difference between the proximal end side link hub 2 side and the distal end side link hub 3 side is eliminated, and therefore, constant velocity can be maintained, and also, occurrence of vibration and abnormal sound can be suppressed. In particular, by providing the bearing clearance in each bearing 12, 19 as a negative clearance, backlash that occurs between an input and an output can be reduced.

By providing the bearings 12 in an embedded manner in the proximal end side link hub 2 and the distal end side link hub 3, it is possible to enlarge the outer shape of each of the proximal end side link hub 2 and the distal end side link hub 3, without enlarging the outer shape of the entire actuation device body 1. Accordingly, the mounting space for mounting the proximal end side link hub 2 and the distal end side link hub 3 to other members can be easily secured.

In FIG. 1 and FIG. 2, the base 52 is an elongated member in the vertical direction, and has a top face to which the proximal end side link hub 2 of the actuation device body 1 is fixed. On the outer periphery of an upper portion of the base 52, an actuator mounting base 55 having a collar shape is provided. To this actuator mounting base 55, the actuator 53 is mounted so as to be suspended therefrom. The number of the actuators 53 is three, the same number as that of the link mechanisms 4. Each actuator 53 is implemented by a rotary actuator, and includes an output shaft on which a bevel gear 56 is mounted. The bevel gear 56 is meshed with a bevel gear 57 having a sector shape and mounted on the shaft member 13 (FIG. 5) of the proximal end side link hub 2.

In the present embodiment, the actuators 53 are provided by the same number as that of the link mechanisms 4. However, as long as at least two of the three link mechanisms 4 are each provided with the actuator 53, the posture of the distal end side link hub 3 relative to the proximal end side link hub 2 can be determined.

In the link actuation device 51A, the controller 54 is operated to drive each actuator 53 to rotate, thereby causing the actuation device body 1 to operate. In detail, when the actuator 53 is driven to rotate, its rotation is transmitted to the shaft member 13 via a pair of the bevel gears 56 and 57, whereby the angle of the proximal side end link member 5 relative to the proximal end side link hub 2 is changed. Accordingly, the position and the posture of the distal end side link hub 3 relative to the proximal end side link hub 2 are determined. In the present embodiment, the angle of the proximal side end link member 5 is changed by the use of the bevel gears 56 and 57, but another mechanism (for example, spur gear or worm mechanism) may be used.

FIG. 1 and FIG. 2 each show a state where an end effector 61 is disposed on the distal end side link hub 3 and a spherical surface workpiece 62, which is to be worked, is supported by the proximal end side link hub 2. The end effector 61 is disposed such that a working portion 61a defined at one end of the end effector 61 faces inside of the arrangement of the link hubs 2 and 3. "Inside of the arrangement of the link hubs 2 and 3" denotes the direction from the proximal end side and distal end side link hubs 2 and 3 toward an intersection O of the respective link hub central axes QA and QB. In the present embodiment, the working portion 61a is disposed between the proximal end side and distal end side link hubs 2 and 3. The central axis of the working portion 61a is aligned with the distal end side link hub central axis QB. The workpiece 62 is disposed to the proximal end side relative to the working portion 61a of the end effector 61. In the present embodiment, the workpiece 62 is disposed such that the spherical surface center of the workpiece 62 is aligned with the intersection O.

Specifically, the end effector 61 is fixed to the end face on the distal end side of the distal end side link hub 3, in a state where the one end or the working portion 61a is passed through the through-hole 10B of the distal end side link hub 3, by means of a plate-shaped portion 61b provided on the other end. In a case of a small end effector 61, the end effector 61 may be fixed to the end face on the proximal end side of the distal end side link hub 3, without the working portion 61a being passed through the through-hole 10B. The workpiece 62 is placed on a workpiece fixing member 63 disposed on the end face on the distal end side of the proximal end side link hub 2. The workpiece 62 may be fixed to the workpiece fixing member 63, or may be simply placed thereon. The workpiece fixing member 63 is disposed, for example, with its lower end inserted in the through-hole 10A (FIG. 3) of the proximal end side link hub 2.

The link actuation device 51A having this configuration can perform work onto the workpiece 62 having a spherical shape from various directions by means of the working portion 61a of the end effector 61, by changing the posture of the distal end side link hub 3 relative to the proximal end side link hub 2 as shown in FIG. 2, for example. At that time, since the end effector 61 is disposed so as to face inside of the arrangement of the proximal end side and distal end side link hubs 2 and 3, the following advantages can be attained.

That is, compared with a case where the end effector 61 is disposed so as to face outside of the arrangement of the proximal end side and distal end side link hubs 2 and 3, the tip end or the working portion 61a of the end effector 61 comes closer to the rotation center of the link actuation device 51A, thus, reducing the moment of inertia of the entirety of the end effector 61. The rotation center of the link actuation device 51A corresponds to the intersection O of the proximal end side link hub central axis QA and the distal end side link hub central axis QB. Since the moment of inertia of the entirety of the end effector 61 is reduced, even when a heavy end effector 61 is mounted, fast operation is achieved. In addition, low output, energy saving and downsizing of the actuator 53 for posture changing can be attained. In particular, this configuration is effective when an end effector 61 having an elongated shape, or an end effector 61 whose center of gravity is on the distal end side closer to the working portion 61*a* is mounted.

Further, as shown in the present embodiment, when the workpiece 62 is disposed between the proximal end side and distal end side link hubs 2 and 3, the tip end of the end effector 61 is positioned so as to face toward the rotation center of the link actuation device 51A. Thus, without being combined with another mechanism such as an XY stage, the link actuation device 51A can perform work onto the workpiece from various directions.

Figure 6:
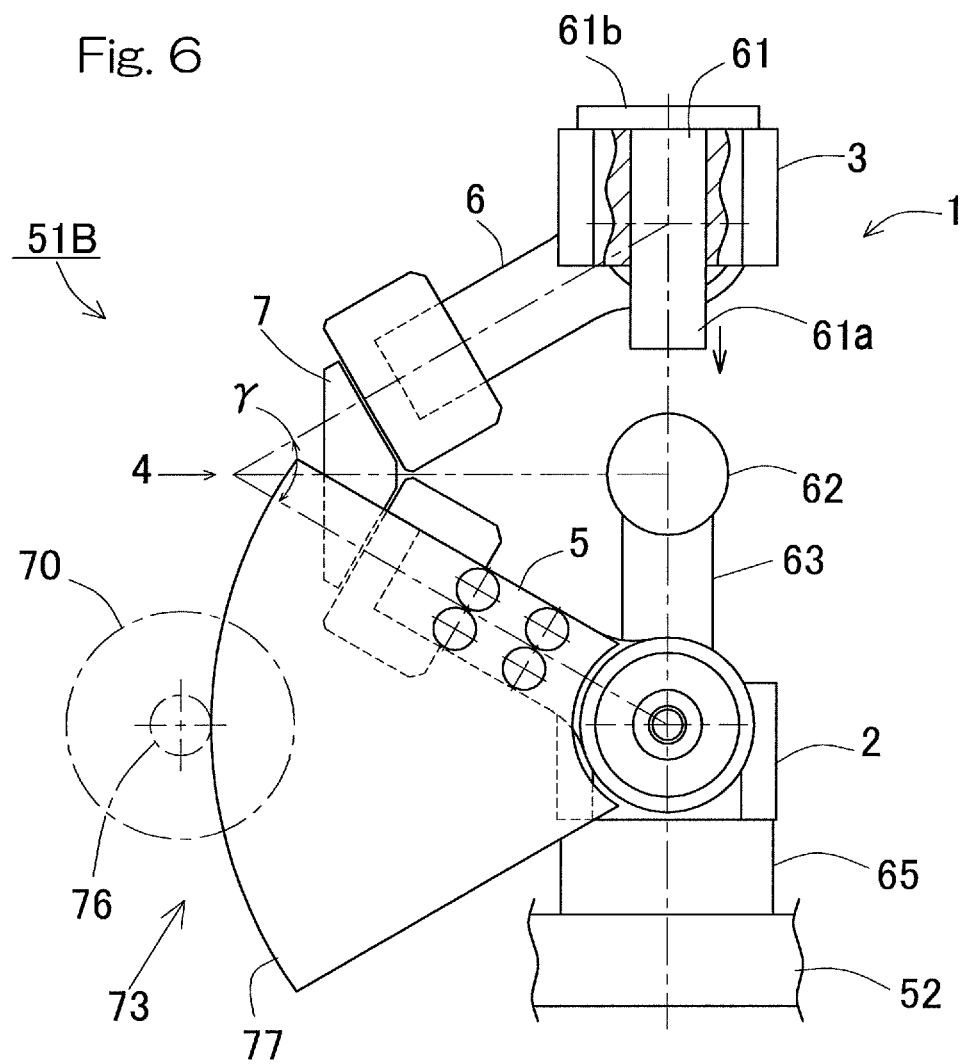
FIG. 6 is a front view of a link actuation device according to a second embodiment of the present invention, shown with a part thereof omitted.
Figure 7:
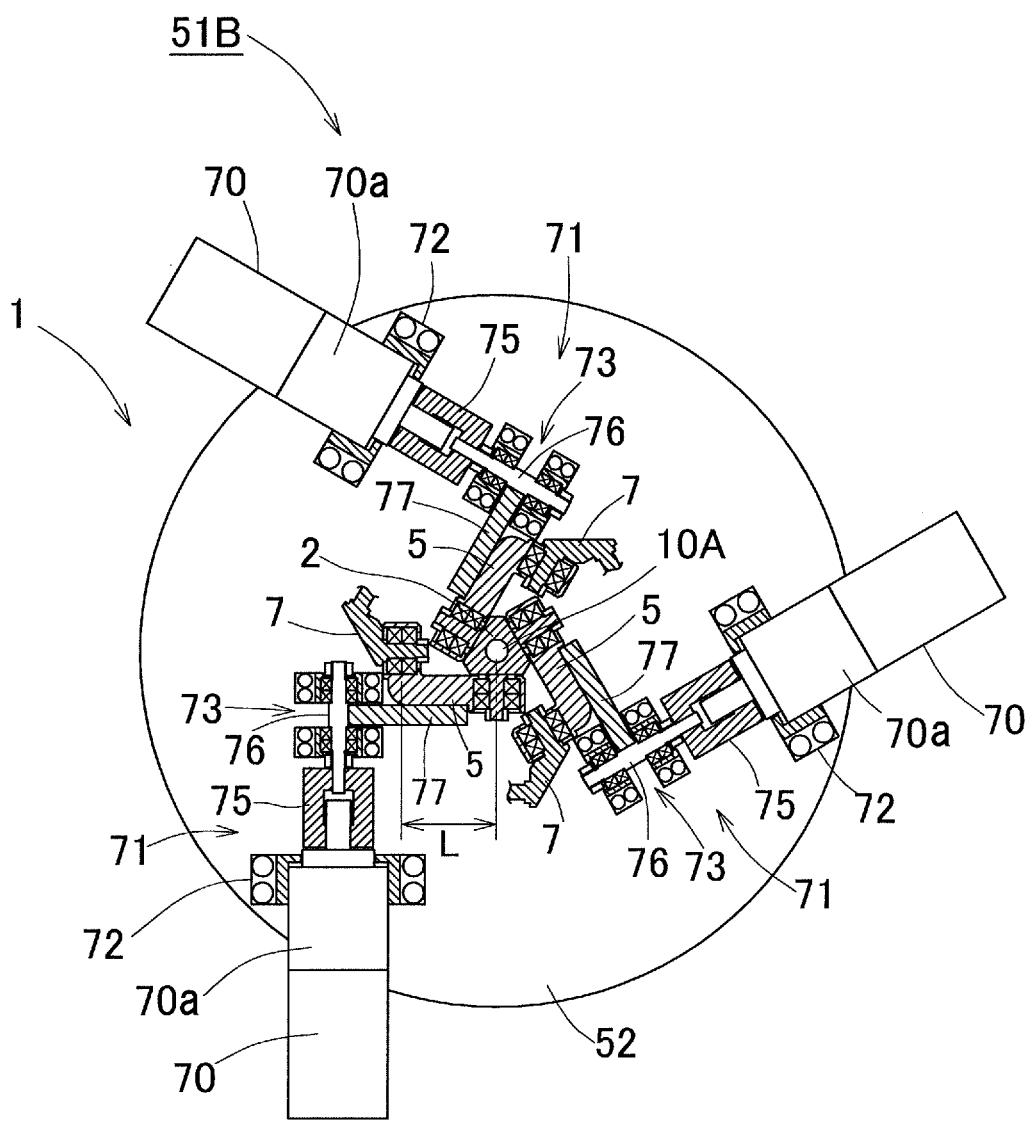
FIG. 7 is a transverse cross-sectional view of a proximal end side link hub of the link actuation device.
Figure 8:
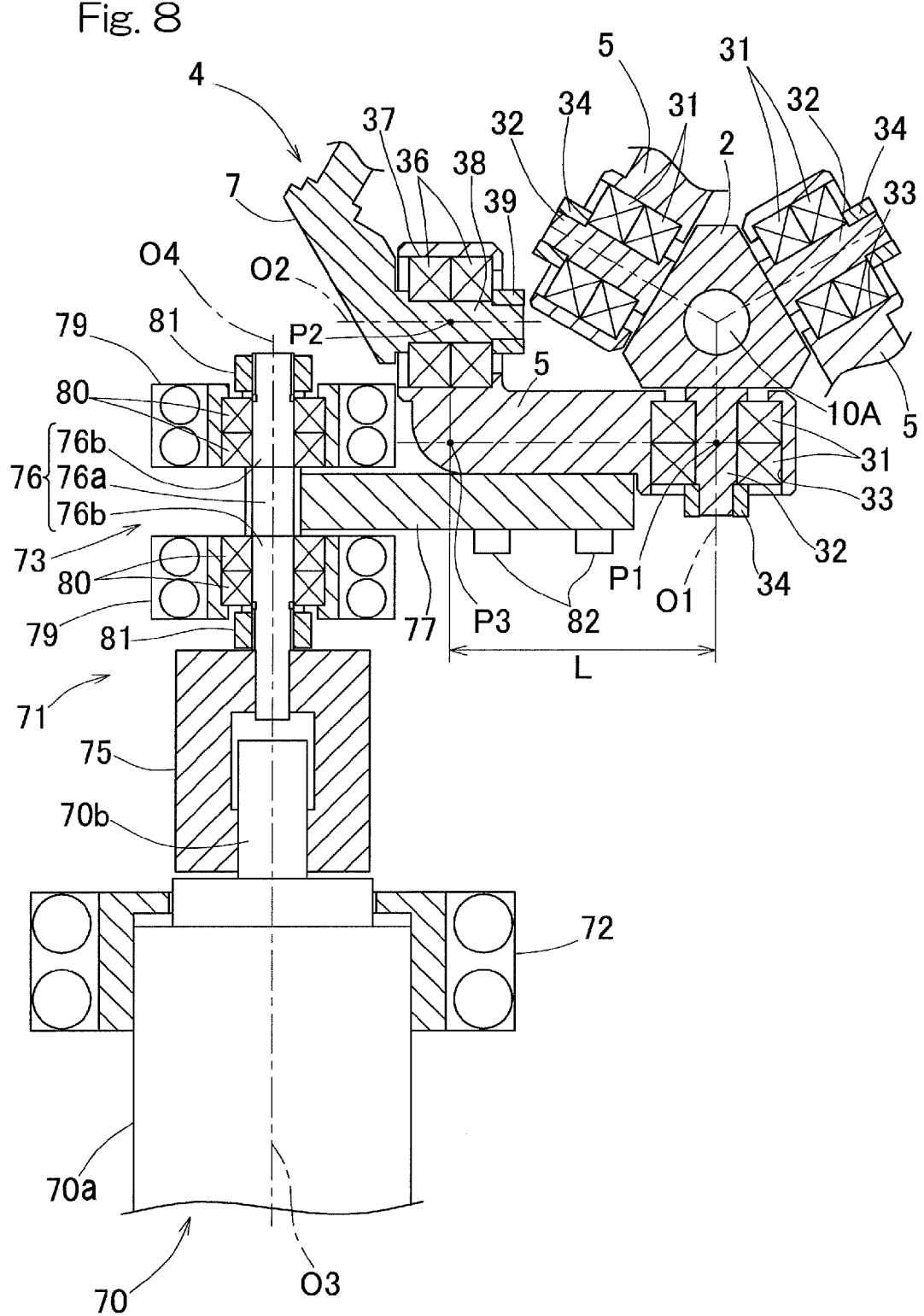
FIG. 8 is an enlarged partial view of FIG. 7.

FIG. 6 to FIG. 8 each show a second embodiment of the link actuation device. As shown in FIG. 6, this link actuation device 51B includes the actuation device body 1 and the base 52 which supports the actuation device body 1, and is configured such that the actuation device body 1 is operated by a plurality of actuators 70. A spacer 65 is interposed between the base 52 and the proximal end side link hub 2 of the actuation device body 1. In addition, as is the case with the link actuation device 51A according to the first embodiment, the end effector 61 is disposed on the distal end side link hub 3, and the workpiece 62 having a spherical shape is supported by the proximal end side link hub 2.

As shown in FIG. 7 and FIG. 8 which is an enlarged partial view thereof, different from the link actuation device 51A according to the first embodiment, the actuation device body 1 of the link actuation device 51B is configured such that bearings 31 which rotatably support the proximal side and distal side end link members 5 and 6 relative to the proximal end side link hub 2 and the distal end side link hub 3 are of an outer ring rotation type. Here, the revolute pair section between the proximal end side link hub 2 and the proximal side end link member 5 will be explained as an example. Shaft portions 32 are formed at three positions in the circumferential direction of the proximal end side link hub 2, and inner rings (not shown) of two bearings 31 are fitted on the outer periphery of each shaft portion 32, and the outer rings (not shown) of the bearings 31 are fitted on the inner periphery of a communication hole 33 formed in the proximal side end link member 5.

Each bearing 31 is a ball bearing such as, for example, a deep groove ball bearing or an angular contact ball bearing, and is fixed under a predetermined amount of preload applied by being fastened with a nut 34. The revolute pair section between the distal end side link hub 3 and the distal side end link member 6 has the same structure as that described above.

With respect to bearings 36 provided in the revolute pair section between the proximal side end link member 5 and the intermediate link member 7, the outer rings (not shown) of the bearings 36 are fitted on the inner periphery of a communication hole 37 formed at the tip end of the proximal side end link member 5, and inner rings (not shown) of the bearings 36 are fitted on the outer periphery of a shaft portion 38 provided integrally with the intermediate link member 7. Each bearing 36 is a ball bearing such as, for example, a deep groove ball bearing or an angular contact ball bearing, and is fixed under a predetermined amount of preload applied by being fastened with a nut 39. The revolute pair section between the distal side end link member 6 and the intermediate link member 7 has the same structure as that described above.

All of the three link mechanisms 4 of the actuation device body 1 are each provided with: an actuator 70 which arbitrarily changes the posture of the distal end side link hub 3 relative to the proximal end side link hub 2 by rotating its corresponding proximal side end link member 5; and a speed reducing mechanism 71 which transmits the amount of operation of the actuator 70 to the proximal side end link member 5 after reducing the speed thereof. The actuator 70 is a rotary actuator, more specifically, a servomotor equipped with a speed reducer 70*a*, and is fixed to the base 52 by means of a motor fixing member 72. The speed reducing mechanism 71 is composed of the speed reducer 70*a* of the actuator 70, and a geared speed reducing unit 73. In the description below, a spur gear is employed as the speed reducing mechanism 71, but another mechanism (for example, bevel gear or worm mechanism) may be used.

The geared speed reducing unit 73 includes a small gear 76 coupled to an output shaft 70*b* of the actuator 70 via a coupling 75 in a rotation transmittable manner, and a large gear 77 fixed to the proximal side end link member 5 and meshed with the small gear 76. In the present embodiment, the small gear 76 and the large gear 77 are each a spur gear, and the large gear 77 is a sector gear having gear teeth formed only on the peripheral surface of the ark portion thereof. The large gear 77 has a radius of the pitch circle greater than that of the small gear 76. The rotation of the output shaft 70*b* of the actuator 70 is transmitted to the proximal side end link member 5 after the rotation has been reduced in speed and made into rotation about a rotation axis O1 of the revolute pair between the proximal end side link hub 2 and the proximal side end link member 5. The speed reduction ratio is 10 or higher.

The radius of the pitch circle of the large gear 77 is set to be greater than or equal to ½ of an arm length L of the proximal side end link member 5. The arm length L is the distance from an axial center point P1 of a central axis O1 of the revolute pair between the proximal end side link hub 2 and the proximal side end link member 5 to a point P3, the point P3 being obtained by projecting an axial center point P2 of a central axis O2 of the revolute pair between the proximal side end link member 5 and intermediate link member 7 onto a plane that is perpendicular to the axis O1 of the revolute pair between the proximal end side link hub 2 and the proximal side end link member 5 and that passes through the axial center point P1. In the case of this embodiment, the radius of the pitch circle of the large gear 77 is greater than or equal to the arm length L, which is advantageous for obtaining a high speed reduction ratio.

The small gear 76 has a teeth portion 76*a* meshed with the large gear 77, and shank portions 76*b* that protrude from opposite sides of the teeth portion 76*a*. Each shank portion 76*b* is rotatably supported by two bearings 80. Each bearing 80 is a ball bearing such as, for example, a deep groove ball bearing or an angular contact ball bearing, and is provided in a rotation support member 79 disposed on the base 52. Other than disposing the double row ball bearings as shown in the present embodiment, a roller bearing or a slide bearing may be used. The outer rings (not shown) of the respective two bearings 80 have a shim (not shown) disposed therebetween, and by fastening a nut 81 thread-engaged on the shank portion 76*b*, a preload is applied to each bearing 80. The outer ring of the bearing 80 is press-fixed into the rotation support member 79.

In the case of the second embodiment, the large gear 77 is a member separate from the proximal side end link member 5, and is detachably mounted on the proximal side end link member 5 by means of connecting members 82 such as bolts or the like. The large gear 77 may be provided integrally with the proximal side end link member 5.

A rotation axis O3 of the actuator 70 and a rotation axis O4 of the small gear 76 are on the same axis. These rotation axes O3 and O4 are set to be parallel to the axis O1 of the revolute pair between the proximal end side link hub 2 and the proximal side end link member 5, and at the same level in height from the base 52.

Since the actuator 70 and the speed reducing mechanism 71 are provided in all of the three link mechanisms 4, the link actuation device 51B can perform control such that rattling of the actuation device body 1 and the speed reducing mechanism 71 can be cut down. Thus, positioning accuracy of the distal end side link hub 3 can be increased, and also the link actuation device 51B itself can have a high rigidity.

In addition, the geared speed reducing unit 73 of the speed reducing mechanism 71 is composed of a combination of the small gear 76 and the large gear 77, and is capable of providing a high speed reduction ratio of 10 or higher. If the speed reduction ratio is high, the positioning resolution by the encoder becomes high, and therefore, the positioning resolution of the distal end side link hub 3 increases. Also, a low-output actuator 70 can be used. In this embodiment, although the actuator 70 equipped with the speed reducer 70a is used, if the speed reduction ratio of the geared speed reducing unit 73 is high, it is possible to use an actuator 70 not equipped with a speed reducer, and as a result, it is possible to downsize the actuator 70.

Since the radius of the pitch circle of the large gear 77 is set to be greater than or equal to ½ of the arm length L of the proximal side end link member 5, the bending moment of the proximal side end link member 5, which is caused by distal end loading, is reduced. For this reason, the rigidity of the actuation device body 1 as a whole can be maintained at a value not higher than necessary, and also the weight of the proximal side end link member 5 can be reduced. For example, the material of the proximal side end link member 5 can be changed from stainless steel (SUS) to aluminum. Also, since the radius of the pitch circle of the large gear 77 is comparatively large, the surface pressure at the teeth portion of the large gear 77 decreases, and the rigidity of the actuation device body 1 increases.

In addition, if the radius of the pitch circle of the large gear 77 is greater than or equal to ½ of the arm length, the large gear 77 is allowed to have a sufficiently large diameter than the outer diameter of each bearing 31 that is disposed at the revolute pair section between the proximal end side link hub 2 and the proximal side end link member 5. Accordingly, space is created between the teeth portion of the large gear 77 and the bearing 31, and thus, the large gear 77 is easy to be disposed.

In particular, in the case of this second embodiment, since the radius of the pitch circle of the large gear 77 is greater than or equal to the arm length L, the radius of the pitch circle of the large gear 77 is further increased, and the operations and effects are further remarkably exhibited. In addition, it becomes possible to dispose the small gear 76 on the outer diameter side relative to the link mechanism 4. As a result, the space for disposing the small gear 76 can be easily ensured and the degree of freedom of designing is increased. Also, interference between the small gear 76 and any other member will hardly occur, and the range of movement of the link actuation device 51B expands.

Since the small gear 76 and the large gear 77 are each a spur gear, the manufacture thereof is easy and, in addition, the transmission efficiency of rotation is high. Since the small gear 76 is supported by the bearings 80 on opposite sides in the axial direction, the support rigidity for the small gear 76 is high. Accordingly, the angle retaining rigidity for the proximal side end link member 5 under the distal end loading is increased, and as a result, the rigidity and the positioning accuracy of the actuation device body 1 are improved. Also, since the rotation axis O3 of the actuator 70, the rotation axis O4 of the small gear 76 and the central axis O1 of the revolute pair between the proximal end side link hub 2 and the proximal side end link member 5 are on the same plane, the overall balance is good and the assemblability is good.

Since the large gear 77 is detachable from the proximal side end link member 5, change in the specification such as the speed reduction ratio of the geared speed reducing unit 73 and the operating range of the distal end side link hub 3 relative to the proximal end side link hub 2 is rendered to be easy, and the mass productivity of the link actuation device 51B is increased accordingly. In other words, the link actuation device 51B can be applied in various usages simply by changing the large gear 77. Moreover, maintenance is easy. For example, when any trouble occurs in the geared speed reducing unit 73, such a trouble can be handled by simply replacing the speed reducing unit 73.

Also, the link actuation device 51B having this configuration can perform work onto the workpiece 62 having a spherical shape from various directions by means of the working portion 61a of the end effector 61, by changing the posture of the distal end side link hub 3 relative to the proximal end side link hub 2. Since the end effector 61 is disposed so as to face inside of the arrangement of the proximal end side and distal end side link hubs 2 and 3, the same operations and effects as those in the above first embodiment can be obtained.

Figure 9:
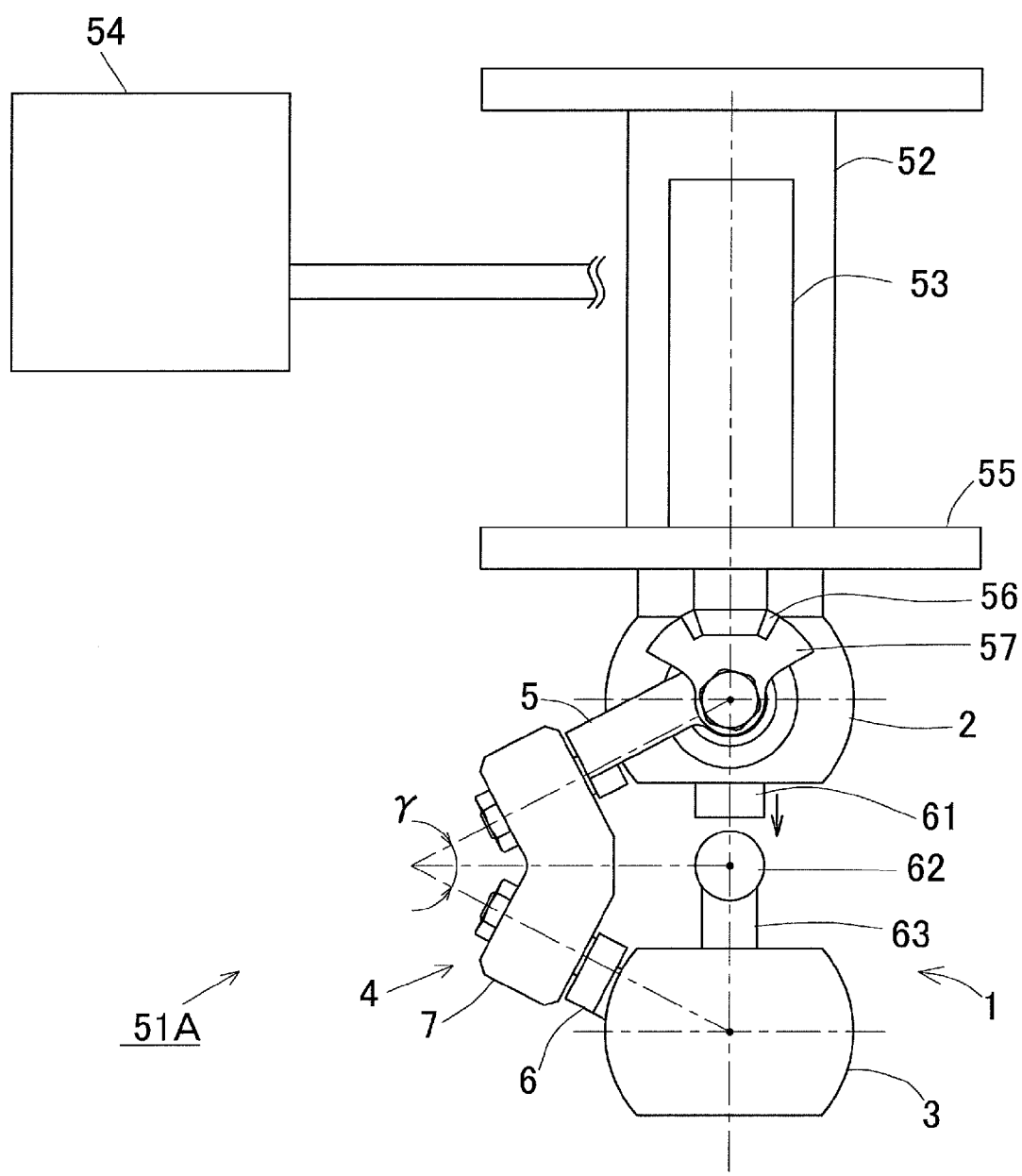
FIG. 9 is a front view showing a state in which the link actuation device shown in FIG. 1 is used upside down, shown with a part thereof omitted.

In the first embodiment shown in FIG. 1 and FIG. 2, the link actuation device 51A is disposed with the proximal end side link hub 2 set on the lower side. However, as shown in the second embodiment in FIG. 9, the link actuation device 51A may be disposed with the proximal end side link hub 2 set on the upper side. In this case, in reverse to the arrangement of the first embodiment shown in FIG. 1 and FIG. 2, in a state where the end effector 61 is disposed at the proximal end side link hub 2, and the workpiece 62 is supported by the distal end side link hub 3, work is performed while the posture of the workpiece 62 is being controlled by the actuation device body 1. FIG. 9 shows an example in which the link actuation device 51A shown in FIG. 1 and FIG. 2 is disposed upside down. However, the link actuation device 51B shown in FIG. 6 may be disposed upside down.

Figure 10:
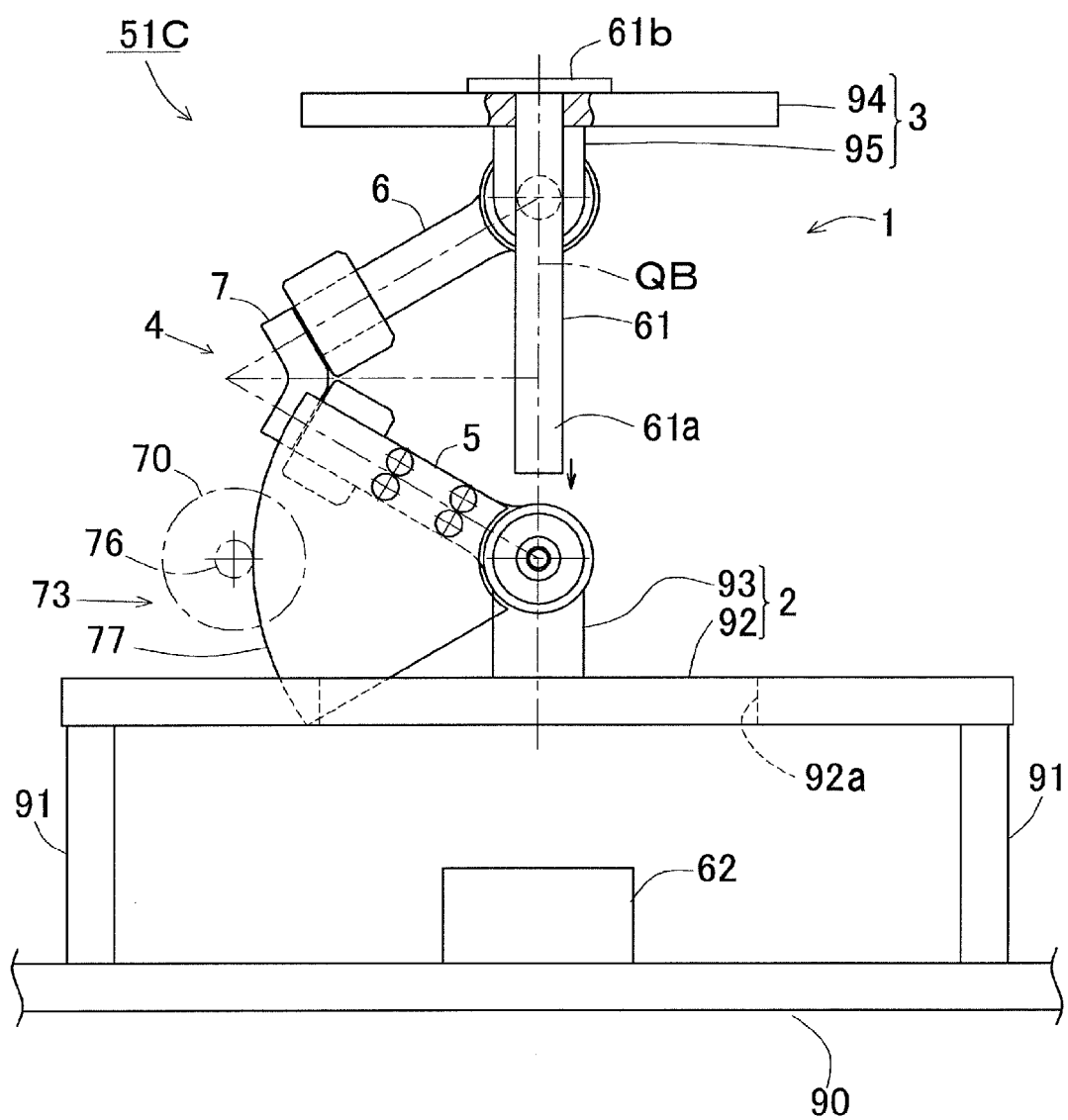
FIG. 10 is a front view of a link actuation device according to a third embodiment of the present invention, shown with a part thereof omitted.
Figure 11:
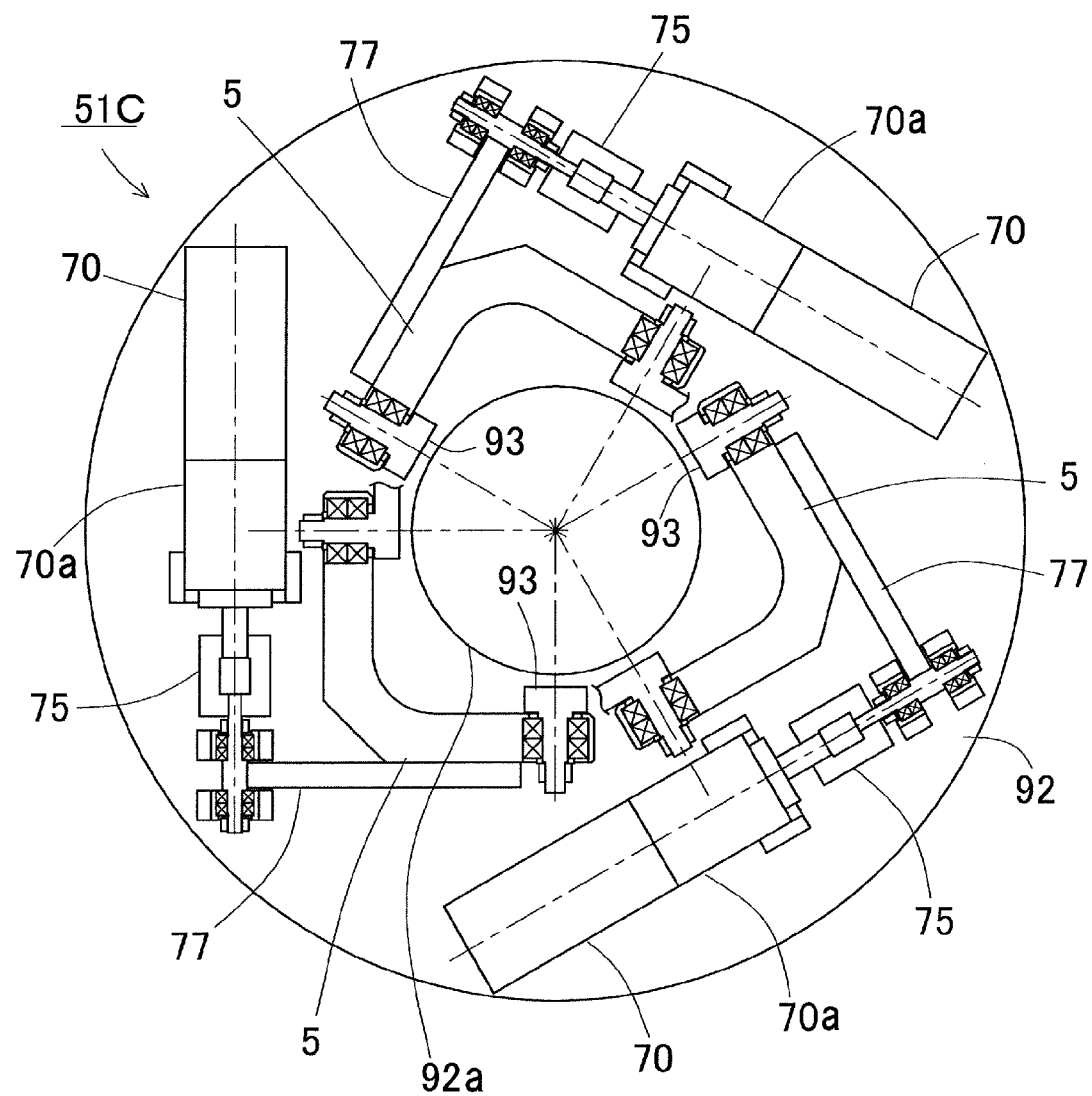
FIG. 11 is a transverse cross-sectional view of a proximal end side link hub of the link actuation device.

FIG. 10 and FIG. 11 each show a third embodiment of the link actuation device. As shown in FIG. 10, in this link actuation device 51C, a base 92 having a plate shape is disposed above a base member 90 via a plurality of posts 91, and rotation shaft members 93 which individually and rotatably support the respective proximal side end link members 5 are fixed on this base 92. The base 92 and the rotation shaft members 93 cooperate together to form the proximal end side link hub 2. Fixation between the base member 90 and the posts 91 and fixation between the posts 91 and the base 92 are realized by means of bolts (not shown) or the like. On the other hand, the respective distal side end link members 6 are individually and rotatably supported by a plurality of rotation shaft members 95 which are fixed to a distal end member 94. The distal end member 94 and the rotation shaft members 95 cooperate together to form the distal end side link hub 3.

As shown in FIG. 11, in a center portion of the base 92, which is located inside the arrangement of the rotation shaft members 93, a work hole 92a penetrating the center portion of the base 92 in the vertical direction and for inserting the end effector thereinto is formed. The actuation device body 1 has basically the same configuration as that of the link actuation device 51B shown in FIG. 6. However, by changing the arrangement and the shape of the respective members, a large space has been formed inside the arrangement of the link mechanisms 4.

With reference to FIG. 10, in the link actuation device 51C, the workpiece 62 is provided in the space surrounded by the posts 91 on the base member 90. The workpiece 62 may be fixed to the base member 90, or may be simply placed without being fixed. The end effector 61 has an elongated shape, and is disposed at the distal end side link hub 3 such that the working portion 61a defined at the tip end of the end effector 61 faces the proximal end side. The central axis of the working portion 61a of the end effector 61 is aligned with the distal end side link hub central axis QB. The end effector 61 is disposed at the distal end side link hub 3, with the plate-shaped portion 61b thereof fixed to the distal end member 94. The working portion 61a of the end effector 61 remotely performs work such as laser irradiation or application of a liquid substance, onto the workpiece 62 in a non-contact manner.

From the state shown in FIG. 10, the link actuation device 51C changes the posture of the distal end side link hub 3 relative to the proximal end side link hub 2, and for example, laser or a liquid substance is emitted or ejected from the working portion 61a of the end effector 61. The emitted laser, liquid substance or the like passes through the work hole 92a of the base 92, thereby working on the workpiece 62 disposed lower than the proximal end side link hub 2. A large space is formed inside the arrangement of the link mechanisms 4, and the work hole 92a of the base 92 has been formed in a slightly larger size. Therefore, without causing interference with components of the link actuation device 51C, the workpiece 62 can be worked with the angle of the end effector 61 being changed.

Figure 12:
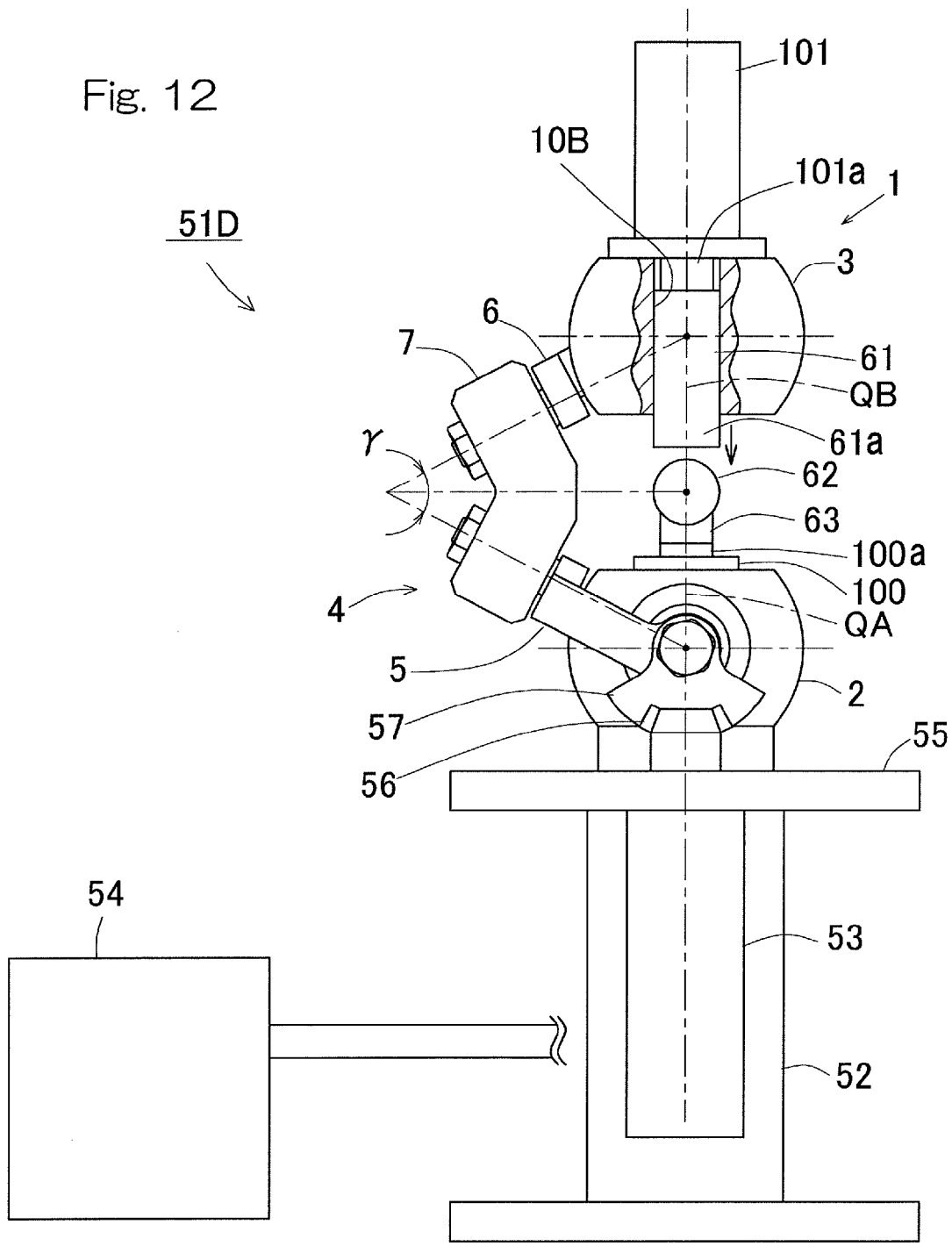
FIG. 12 is a front view of a link actuation device according to a fourth embodiment of the present invention, shown with a part thereof omitted.
Figure 13:
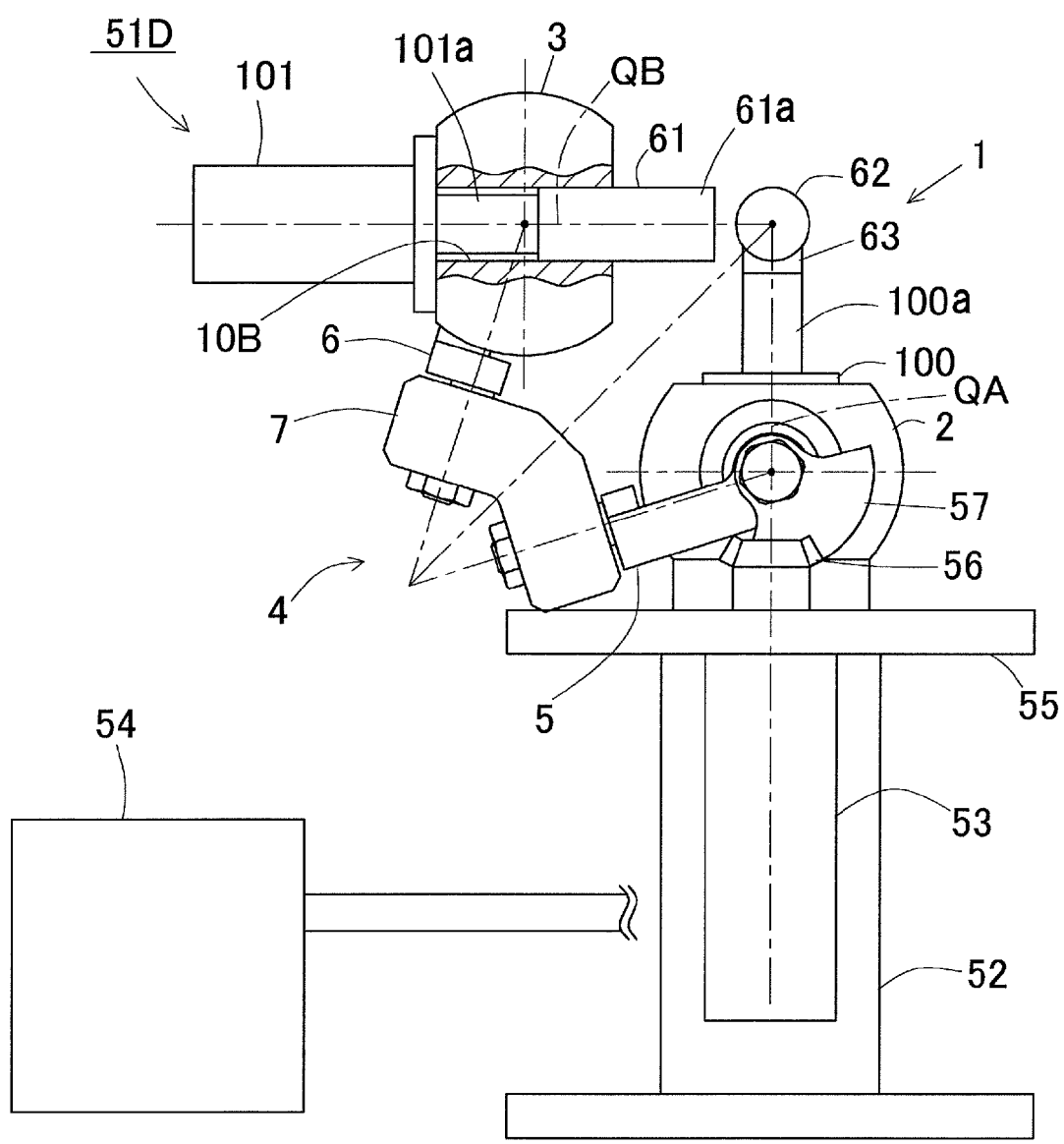
FIG. 13 is a front view showing a different operation state of the link actuation device, shown with a part thereof omitted.

FIG. 12 and FIG. 13 each show a fourth embodiment. With respect to a link actuation device 51D according to the fourth embodiment, the actuation device body 1 has the same configuration as that of the link actuation device 51A according to the first embodiment shown in FIG. 1 and FIG. 2. The different point between the first and fourth embodiments is that, in the link actuation device 51D, the proximal end side link hub 2 and the distal end side link hub 3 are respectively provided with linear motion actuators 100 and 101 which advance and retract along the link hub central axes QA and QB, such that the linear motion actuators 100 and 101 face inside of the arrangement of the proximal end side and distal end side link hubs 2 and 3. The linear motion actuator 100 on the proximal end side is fixedly provided in the through-hole 10A (FIG. 3) of the proximal end side link hub 2, and a rod 100a of the linear motion actuator 100 protrudes to the distal end side. The linear motion actuator 101 on the distal end side is fixed to the end face on the distal end side of the distal end side link hub 3, and a rod 101a of the linear motion actuator 101 is inserted in the through-hole 10B of the distal end side link hub 3.

In the present embodiment, the workpiece 62 having a spherical shape is fixed via the workpiece fixing member 63 to the distal end of the rod 100a of the linear motion actuator 100 on the proximal end side, and the end effector 61 is fixed to the distal end of the rod 101a of the linear motion actuator 101 on the distal end side. The end effector 61 is capable of advancing and retracting in the through-hole 10B, and the working portion 61a defined at the distal end protrudes to the proximal end side relative to the distal end side link hub 3.

When the workpiece 62 is worked by the end effector 61 while the posture of the distal end side link hub 3 relative to the proximal end side link hub 2 being changed, the link actuation device 51D causes the linear motion actuator 100 on the proximal end side to advance and retract in accordance with the change in the posture. Accordingly, the workpiece 62 is caused to advance and retract along the proximal end side link hub central axis QA such that the spherical surface center of the workpiece 62 is positioned at the intersection O of the link hub central axes QA and QB at all times.

By causing the linear motion actuator 101 on the distal end side to advance and retract in accordance with the change in the posture, the end effector 61 is caused to advance and retract along with the distal end side link hub central axis QB such that the working portion 61a of the end effector 61 is perpendicular to the workpiece 62 at all times and at a constant distance from the workpiece 62. Accordingly, the workpiece 62 can be worked by the working portion 61a from various directions, while keeping the angle and the distance at all times.

Figure 14:
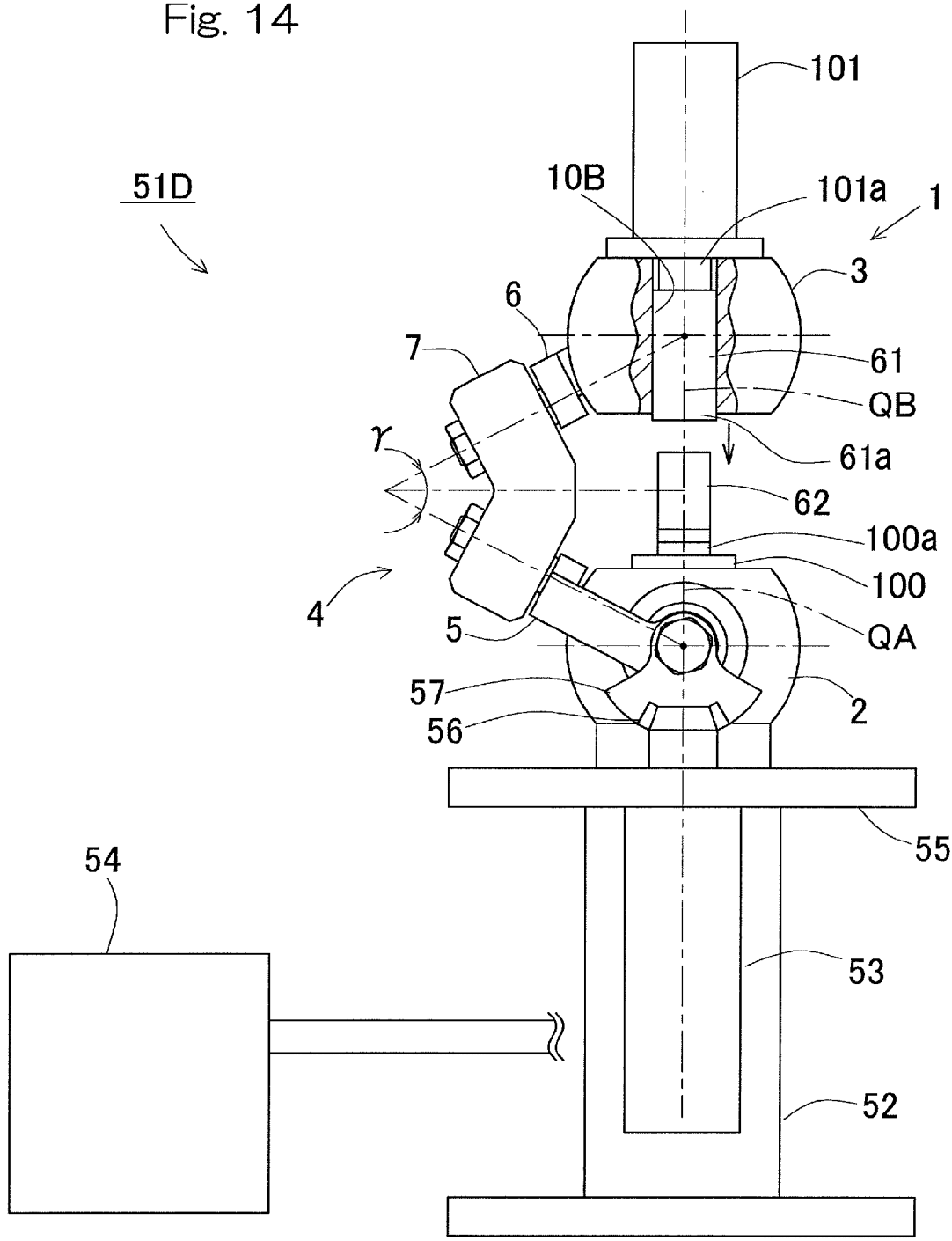
FIG. 14 is a front view showing a use state different from that shown in FIG. 12 of the link actuation device, shown with a part thereof omitted.
Figure 15:
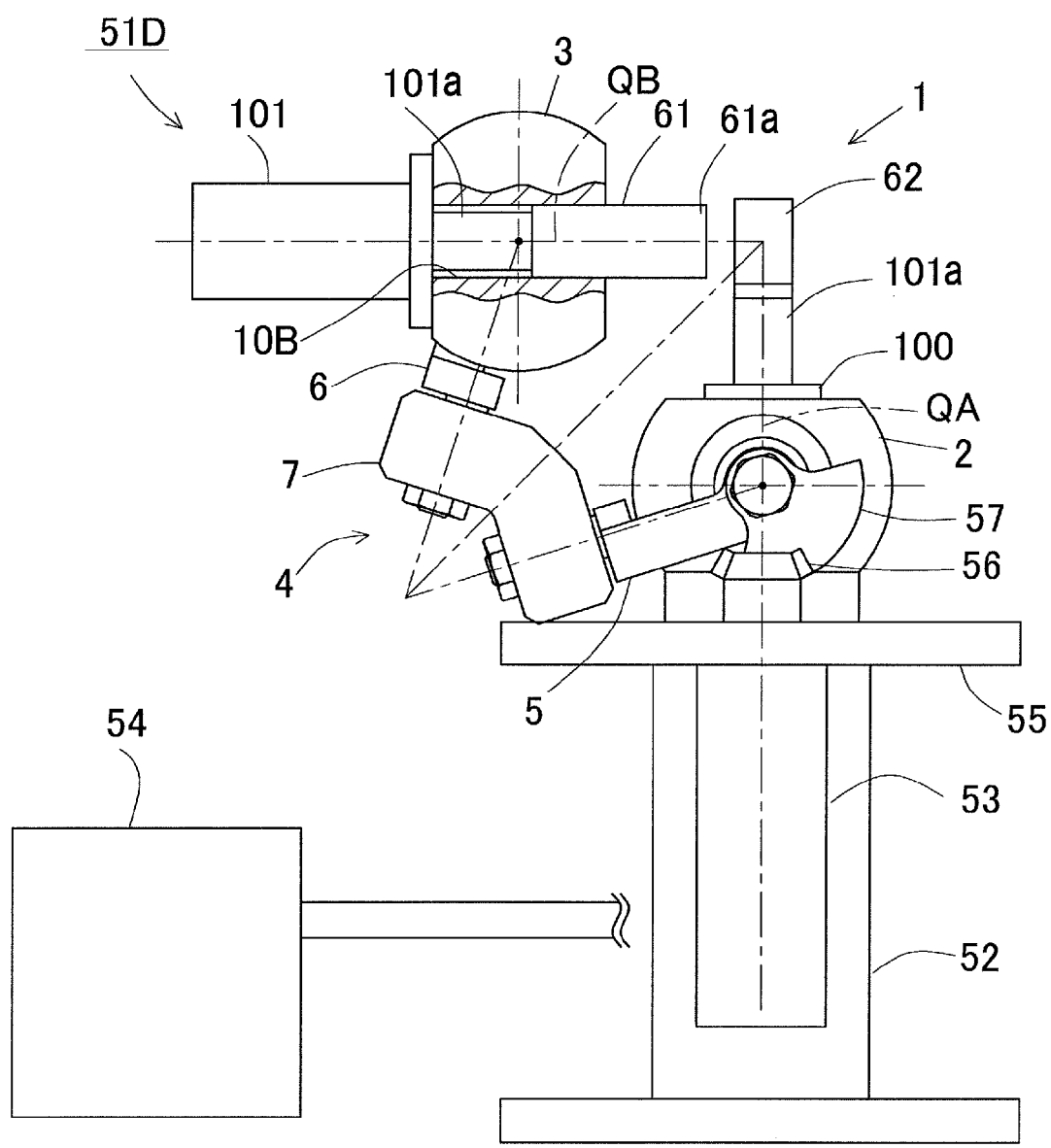
FIG. 15 is a front view showing a different operation state in the use state shown in FIG. 14 of the link actuation device, shown with a part thereof omitted.

FIG. 14 and FIG. 15 each show a mode of use in which the shape of the outer periphery of the workpiece 62 in the mode of use shown in FIG. 12 and FIG. 13 is changed from the spherical shape to a cylindrical shape. In this case, it is possible to perform work onto the upper end face and the outer peripheral face of the workpiece 62 having the cylindrical shape.

In the fourth embodiment shown in FIG. 12 to FIG. 15, in reverse to these embodiments, the end effector 61 may be disposed at the linear motion actuator 100 on the proximal end side, and the workpiece 62 may be supported by the linear motion actuator 101 on the distal end side. Alternatively, the linear motion actuators 100 and 101 may be provided at the proximal end side and distal end side link hubs 2 and 3 having the configuration shown in FIG. 6 or FIG. 10. Further, the linear motion actuator may be provided at either one of the proximal end side and the distal end side link hubs.

Figure 16:
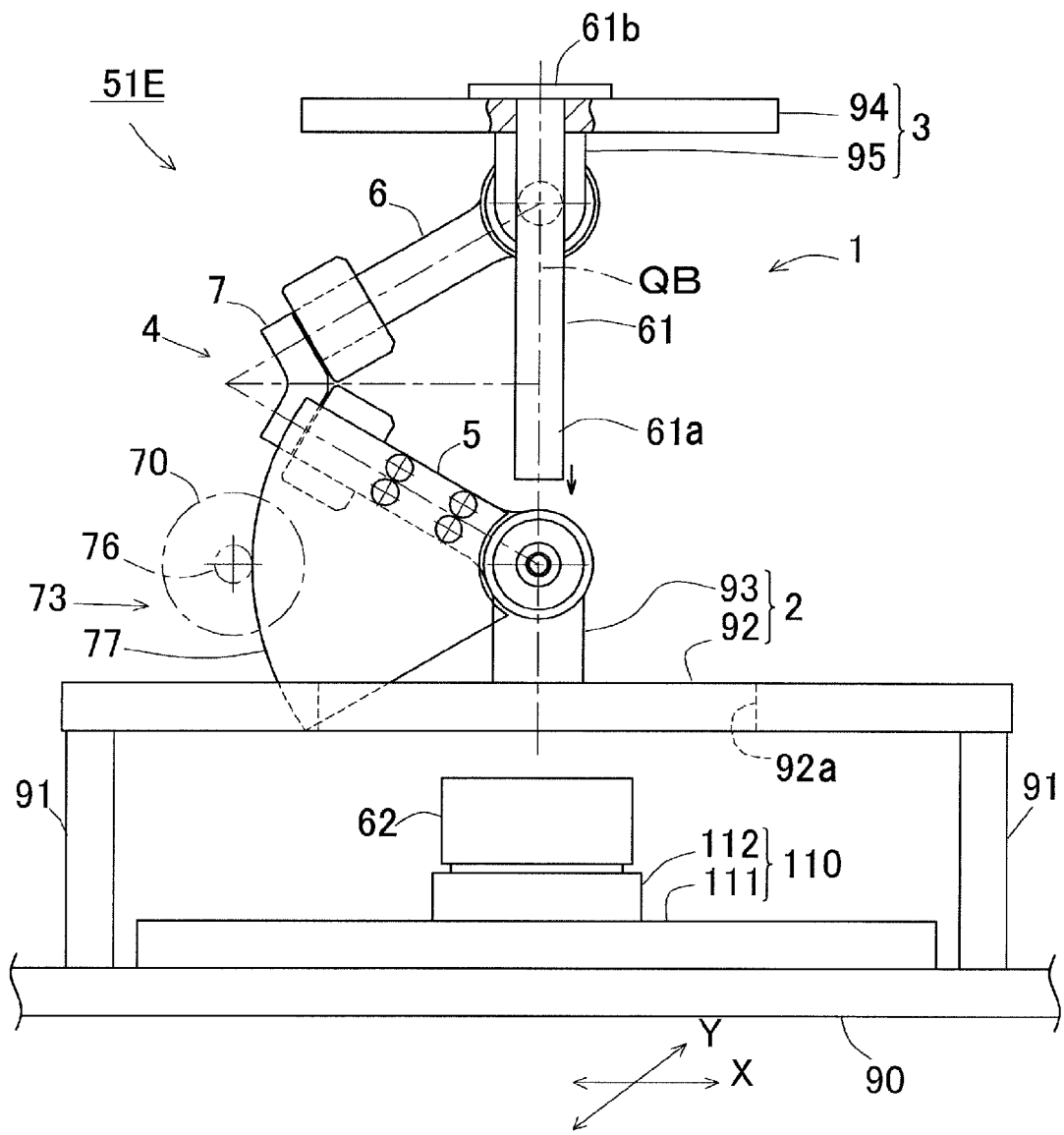
FIG. 16 is a front view of a link actuation device according to a fifth embodiment of the present invention, shown with a part thereof omitted.

A link actuation device 51E according to a fifth embodiment shown in FIG. 16 is provided with an XY stage 110 obtained by combining a two-axis linear motion actuator with the base member 90 in the link actuation device 51C according to the third embodiment shown in FIG. 10. In the fifth embodiment, the XY stage 110 includes: an X-axis linear motion actuator 111 which advances and retracts in a horizontal direction parallel to the drawing sheet (X-axis direction) and which is disposed on the base member 90; and a Y-axis linear motion actuator 112 which advance and retracts in a horizontal direction perpendicular to the drawing sheet (Y-axis direction) and which is disposed on the X-axis linear motion actuator 111.

The workpiece 62 is placed on the Y-axis linear motion actuator 112. The end effector 61 is disposed on the distal end side link hub 3 such that the working portion 61a defined at the tip end faces the proximal end side as is the case with FIG. 10. The central axis of the working portion 61a of the end effector 61 is aligned with the distal end side link hub central axis QB.

By changing the posture of the distal end side link hub 3 relative to the proximal end side link hub 2, the link actuation device 51E can work on the workpiece 62 while changing the angle of the end effector 61. In addition, by moving the workpiece 62 in the X-axis direction and the Y-axis direction by means of the XY stage 110, the workpiece 62 can be worked at an angle from various directions. For example, when the workpiece 62 is a cube, work can be performed on five faces excluding the bottom face.

Figure 17:
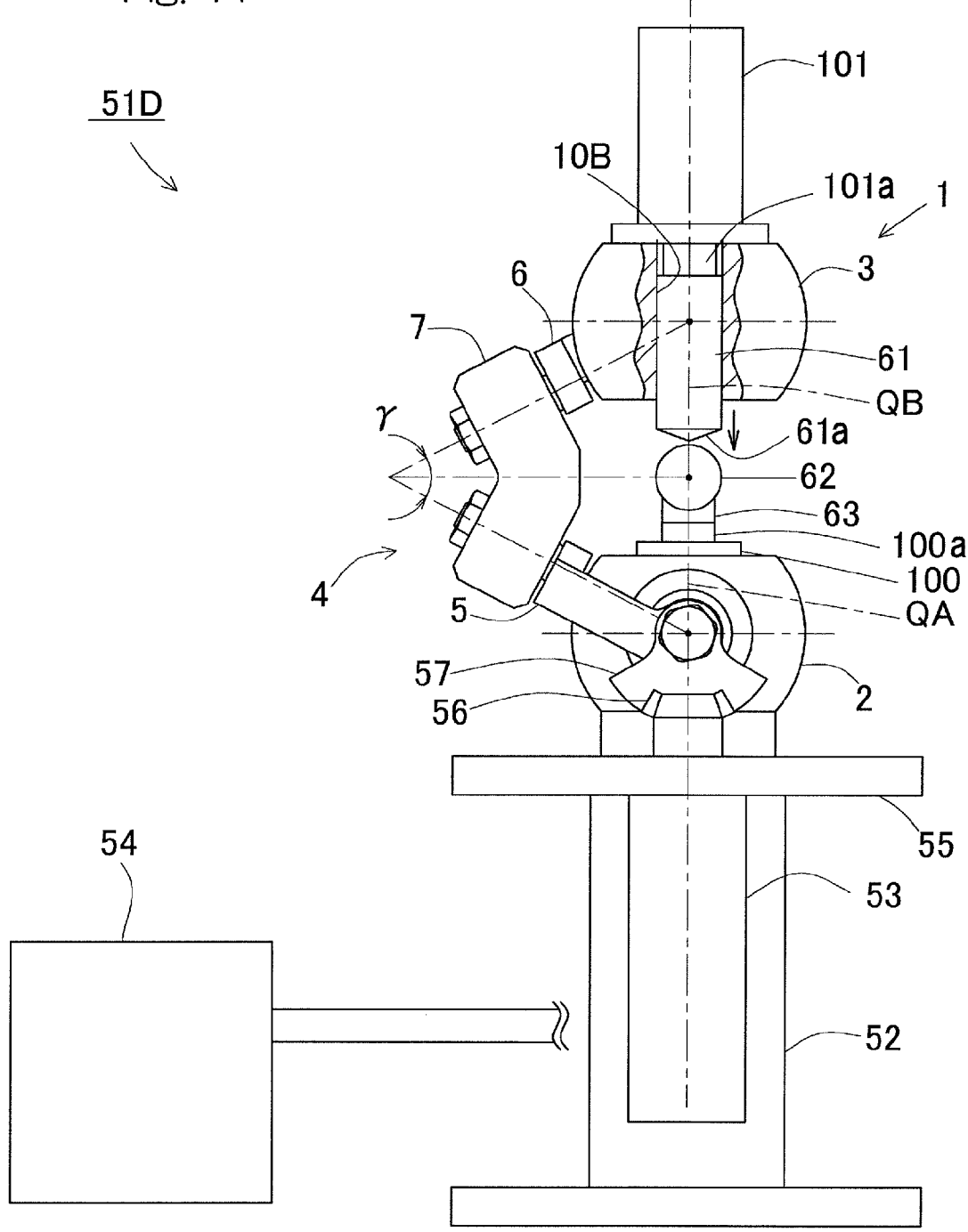
FIG. 17 is a front view of a state in which the link actuation device shown in FIG. 12 is used as a coating device, shown with a part thereof omitted.

FIG. 17 shows a drawing device obtained by mounting, to the link actuation device 51D shown in FIG. 12 to FIG. 15, an inkjet device which applies a paint as the end effector 61. The inkjet device is an applicator or coater which applies a liquid substance to a surface of the workpiece 62. The end effector 61 or an inkjet device is disposed such that the central axis of the working portion 61a or the nozzle portion is aligned with the distal end side link hub central axis QB. As the workpiece 62, any drawing target can be selected. For example, when the workpiece 62 is a nail of a person, nail art can be provided. Painting a wind-bell, an accessory or the like can also be performed.

Figure 18:
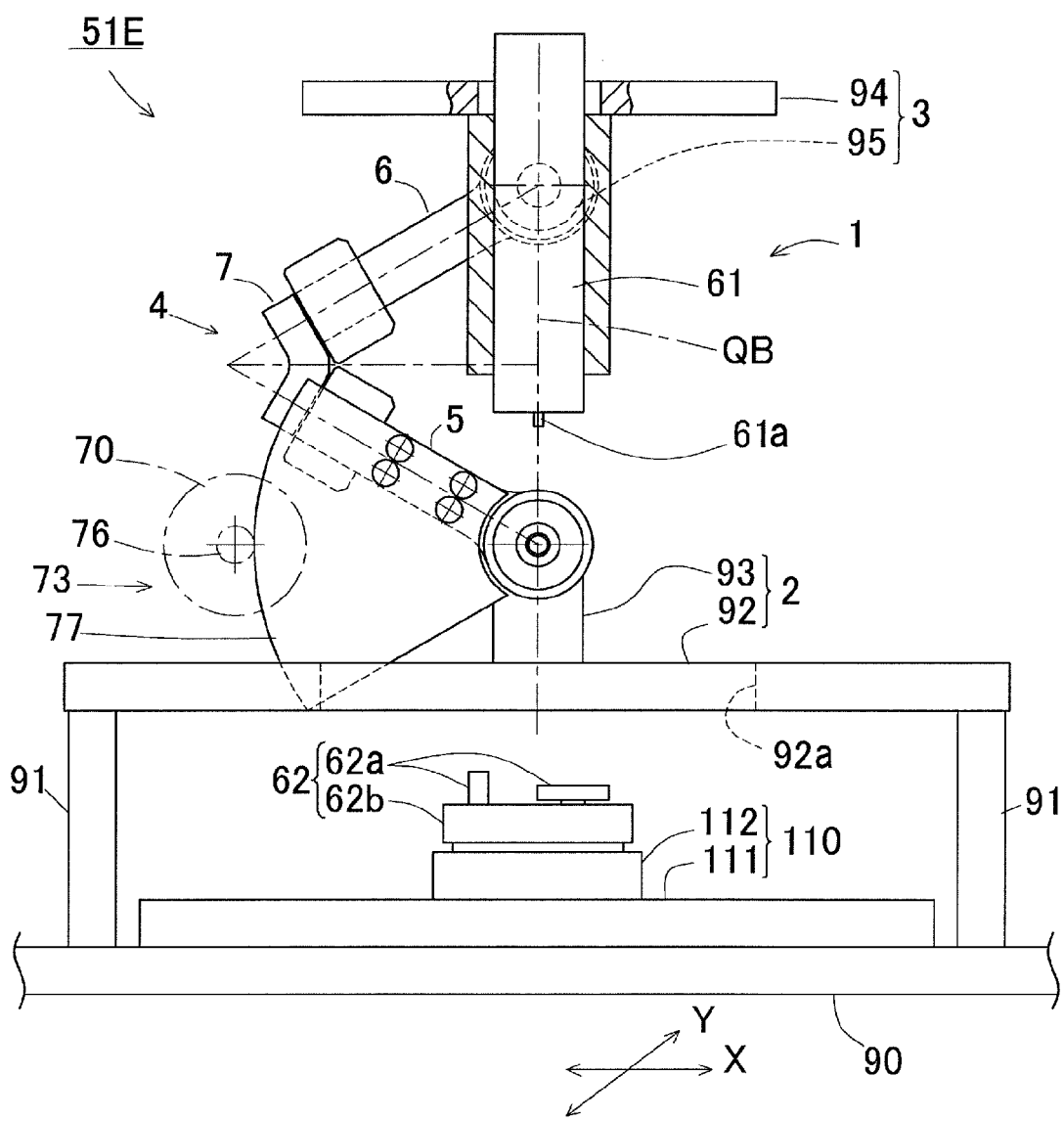
FIG. 18 is a front view showing a state in which the link actuation device shown in FIG. 16 is used as a coating device, shown with a part thereof omitted.

FIG. 18 shows an application device obtained by mounting, to the link actuation device 51E shown in FIG. 16, a dispenser which applies a liquid agent such as grease or adhesive as the end effector 61. The dispenser is an applicator or coater which applies a liquid substance to a surface of the workpiece 62. The dispenser of the present embodiment applies a liquid agent to the workpiece 62 in a non-contact manner by jetting the liquid agent. The end effector 61 or a dispenser is disposed such that the central axis of the working portion 61a or the nozzle portion is aligned with the distal end side link hub central axis QB. The workpiece 62 in the present embodiment includes: components 62a such as, for example, a gear member and a columnar member; and a housing 62b into which the components 62a are incorporated.

This application device can apply a liquid agent, at an angle, to the entire periphery of the teeth surface of the gear member or the entire side face of the columnar member which are components 62a of the workpiece 62. In general, dispensers often have elongated shapes, and in addition, have the center of gravity thereof closed to a tip end portion thereof. Thus, a large inertia tends to act on the tip end of the actuation device body 1. However, as shown in this configuration, when the end effector 61 or a dispenser is disposed so as to face inside of the arrangement of the proximal end side and distal end side link hubs 2 and 3, the inertia acting on the tip end of the actuation device body 1 can be reduced.

Figure 19:
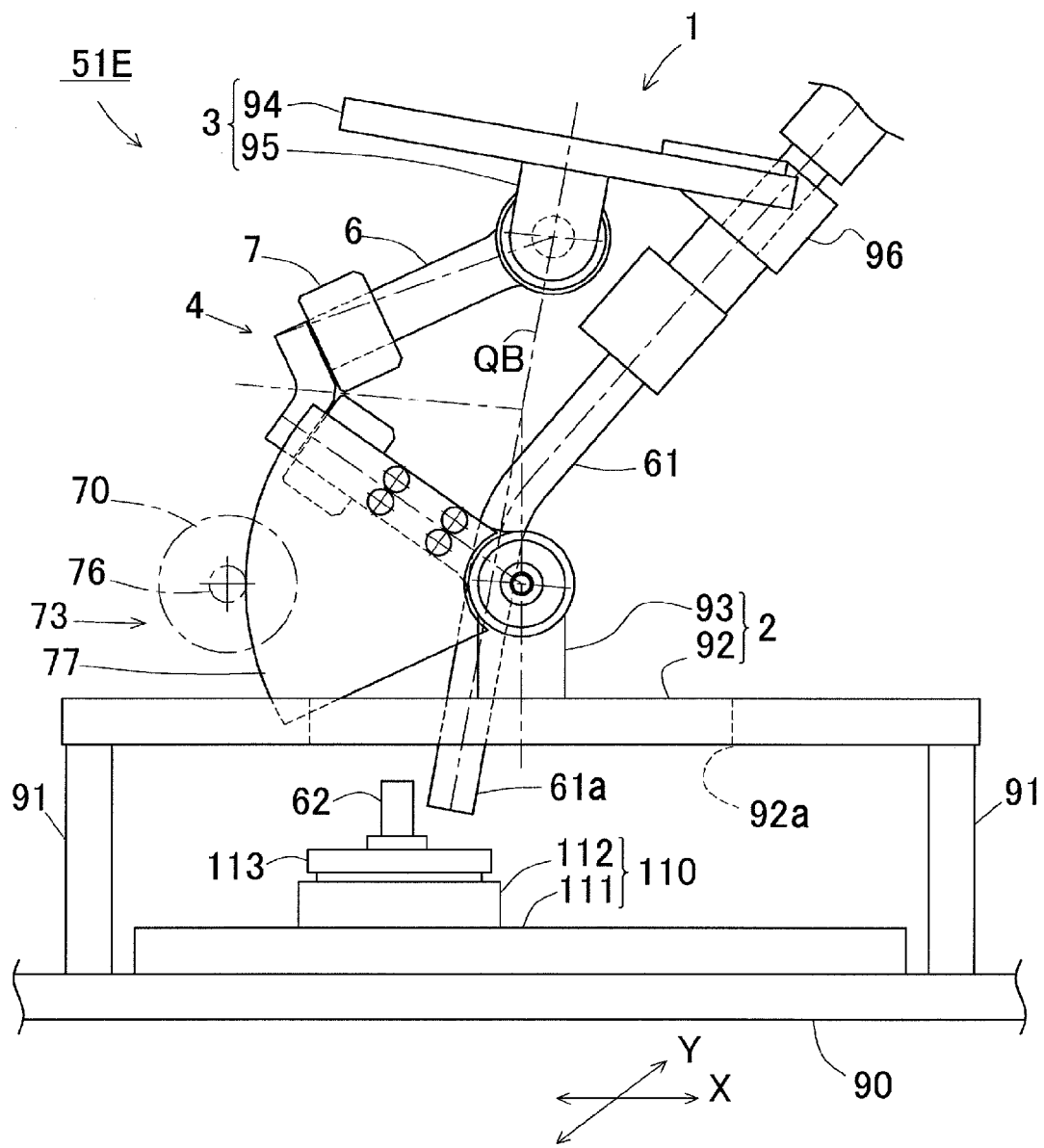
FIG. 19 is a front view showing a state in which the link actuation device shown in FIG. 16 is used as a welding machine, shown with a part thereof omitted.

FIG. 19 shows a welding machine obtained by mounting a welding torch serving as the end effector 61, to the link actuation device 51E shown in FIG. 16. The end effector 61 or a welding torch has a shape bent in an L-shape, and is mounted via a mounting member 96 to the distal end member 94 of the distal end side link hub 3, with the central axis of the tip end of the torch or the working portion 61a aligned with the distal end side link hub central axis QB. The tip end of the torch protrudes below the proximal end side link hub 2 through the work hole 92a in the base 92. The workpiece 62 is placed on a workpiece placement table 113 provided on the XY stage 110.

While moving the workpiece 62 in the X-axis direction and the Y-axis direction by means of the XY stage 110, the welding machine can perform work by causing the end effector 61 or a welding torch inclined in various directions. Thus, even in a case where the workpiece 62 has a columnar shape, welding can be performed on the entire peripheral surface of the workpiece 62. Although the welding torch has an elongated shape, when the end effector 61 is disposed so as to face inside of the arrangement of the proximal end side and distal end side link hubs 2 and 3 as shown in the present embodiment, the inertia acting on the tip end of the actuation device body 1 can be reduced.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

2 . . . proximal end side link hub
3 . . . distal end side link hub
4 . . . link mechanism
5 . . . proximal side end link member
6 . . . distal side end link member
7 . . . intermediate link member
51A, 51B, 51C, 51D, 51E . . . link actuation device
53, 70 . . . actuator
61 . . . end effector
61a . . . working portion
62 . . . workpiece
92a . . . work hole
100, 101 . . . linear motion actuator
110 . . . XY stage
0 . . . intersection
QA . . . proximal end side link hub central axis
QB . . . distal end side link hub central axis

What is claimed is:

1. A link actuation device comprising:
a proximal end side link hub;
a distal end side link hub; and
three or more link mechanisms, each non-telescopically rotatably coupling the distal end side link hub to the proximal end side link hub such that a posture of the distal end side link hub is variable relative to the proximal end side link hub,
wherein each of the link mechanisms includes: a proximal side end link member having one end thereof rotatably coupled to the proximal end side link hub; a distal side end link member having one end thereof coupled to the distal end side link hub; and an intermediate link member having opposite ends thereof rotatably coupled to other ends of the proximal side end link member and the distal side end link member, respectively,
each of the link mechanisms has such a shape that a geometric model of the link mechanism represented by straight lines shows symmetry between a proximal end side portion thereof and a distal end side portion thereof with respect to a center portion of the intermediate link member,
two or more link mechanisms among the three or more link mechanisms are each provided with an actuator which arbitrarily changes the posture of the distal end side link hub relative to the proximal end side link hub, and
an end effector is disposed in one of the proximal end side and distal end side link hubs so as to face inside of arrangement of the proximal end side link hub and the distal end side link hub, and the end effector performs work onto a workpiece disposed on the link hub side opposite to the other of the proximal end side and distal end side link hubs, wherein the workpiece is immovably supported directly by the link hub that is on the opposite side to the link hub where the end effector is disposed, the workpiece being disposed such that the workpiece is aligned with an intersection between a central axis of the proximal end side link hub and a central axis of the distal end side link hub.

2. The link actuation device as claimed in claim 1, wherein the workpiece is disposed between the proximal end side link hub and the distal end side link hub.

3. The link actuation device as claimed in claim 1, wherein the end effector is disposed on the distal end side link hub, a work hole which allows the end effector to be inserted therein is provided in the proximal end side link hub, and the end effector inserted in the work hole performs work onto the workpiece which is directly supported by the proximal end side link hub and which is located to a proximal end side relative to the proximal end side link hub.

4. The link actuation device as claimed in claim 1, wherein the end effector comprises an applicator that applies a liquid substance to a surface of the workpiece.

5. The link actuation device as claimed in claim 1, wherein the end effector is a welding torch.

6. The link actuation device as claimed in claim 1, wherein the end effector is mounted on a linear motion actuator which advances and retracts along a central axis of the link hub where the end effector is disposed.

* * * * *